(12) United States Patent
Fima

(10) Patent No.: US 7,900,288 B2
(45) Date of Patent: Mar. 8, 2011

(54) DRAIN CARTRIDGE HAVING REMOVABLE VALVED SYSTEM

(75) Inventor: Giovanni Fima, Oceanside, CA (US)

(73) Assignee: Liquidbreaker, LLC, Carlsbad, CA (US)

( * ) Notice: Subject to any disclaimer, the term of this patent is extended or adjusted under 35 U.S.C. 154(b) by 0 days.

(21) Appl. No.: 12/900,785

(22) Filed: Oct. 8, 2010

(65) Prior Publication Data

US 2011/0010833 A1    Jan. 20, 2011

Related U.S. Application Data

(63) Continuation-in-part of application No. 12/765,123, filed on Apr. 22, 2010, which is a continuation-in-part of application No. 12/154,891, filed on May 28, 2008.

(60) Provisional application No. 61/175,705, filed on May 5, 2009, provisional application No. 61/175,831, filed on May 6, 2009, provisional application No. 61/177,150, filed on May 11, 2009, provisional application No. 61/262,981, filed on Nov. 20, 2009, provisional application No. 61/289,633, filed on Dec. 23, 2009, provisional application No. 60/932,700, filed on Jun. 1, 2007.

(51) Int. Cl.
*A47K 1/14* (2006.01)

(52) U.S. Cl. .................................. 4/287; 4/301

(58) Field of Classification Search .............. 4/286, 287, 4/295, 301, 309, 310, 688; 137/512.4, 512.15
See application file for complete search history.

(56) References Cited

U.S. PATENT DOCUMENTS

| | | | |
|---|---|---|---|
| 1,137,516 A * | 4/1915 | Moon | 137/247.15 |
| 2,912,999 A | 11/1959 | Kersh | |
| 3,934,596 A | 1/1976 | Suntheimer et al. | |
| 4,088,149 A * | 5/1978 | Logsdon | 137/433 |
| 4,180,875 A | 1/1980 | Wilson | |
| 5,711,037 A * | 1/1998 | Reichardt et al. | 4/301 |
| 6,273,124 B1 | 8/2001 | Huber et al. | |
| 6,286,153 B1 | 9/2001 | Keller | |
| 6,401,266 B1 | 6/2002 | Mitchell et al. | |
| 2006/0101565 A1 | 5/2006 | Cummings | |
| 2006/0207005 A1 | 9/2006 | Janssen | |

FOREIGN PATENT DOCUMENTS

| | | |
|---|---|---|
| EP | 0470518 B1 | 5/1994 |
| WO | 2009/040524 | 4/2009 |

* cited by examiner

*Primary Examiner* — Huyen Le
(74) *Attorney, Agent, or Firm* — Fish & Associates, PC

(57) ABSTRACT

Various embodiments of a cartridge for regulating a fluid flow are described that include an upper housing, and an insert that is user-removable from the upper housing. The cartridge can include one or more valves that are biased in a closed position to prevent odors from escaping the cartridge. The cartridge can also include a fluid trap that is at least partially disposed within the cartridge or fluidly coupled thereto. An ultraviolet light can be inserted within the cartridge to disinfect a fluid passageway of the cartridge.

20 Claims, 19 Drawing Sheets

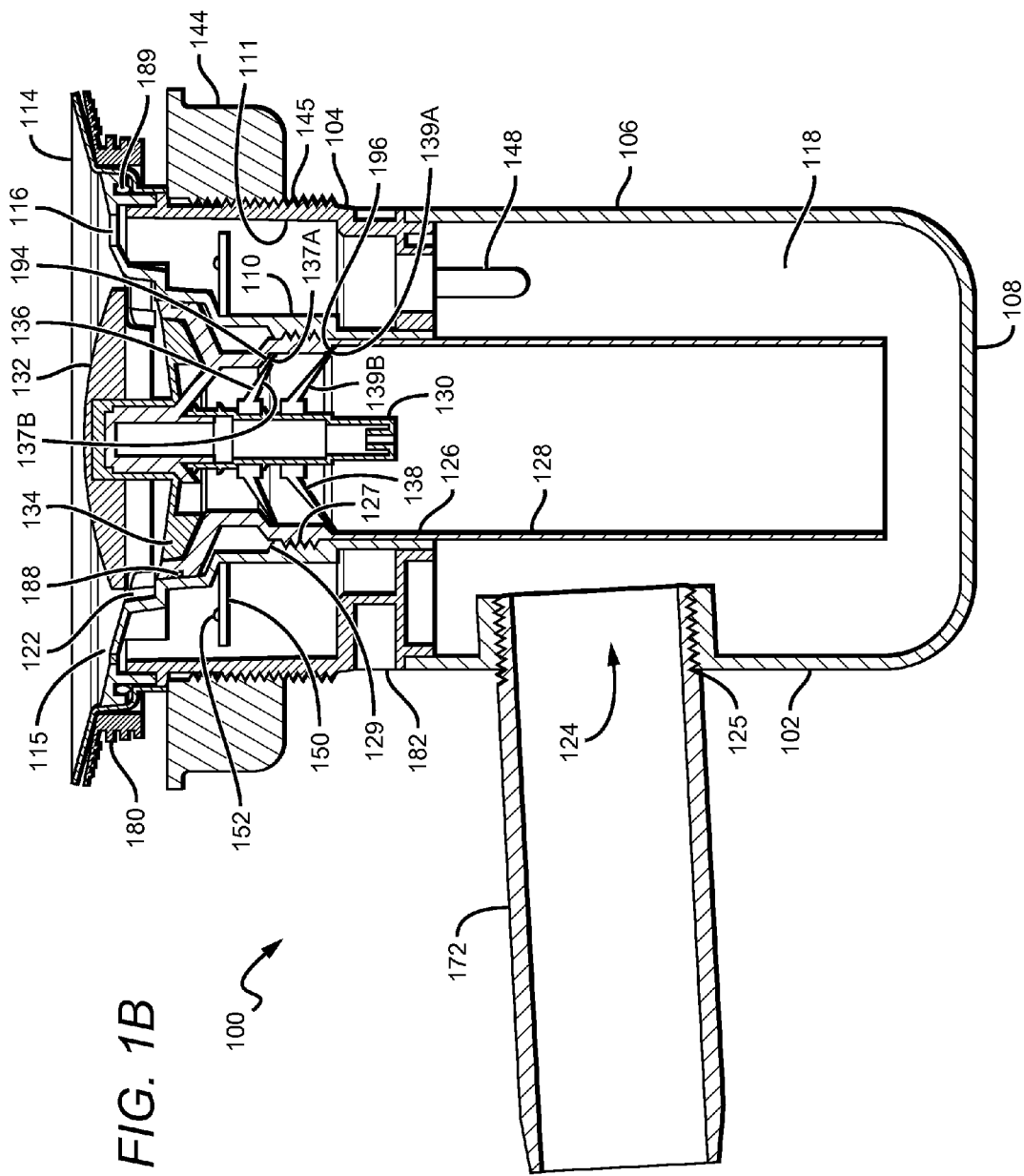

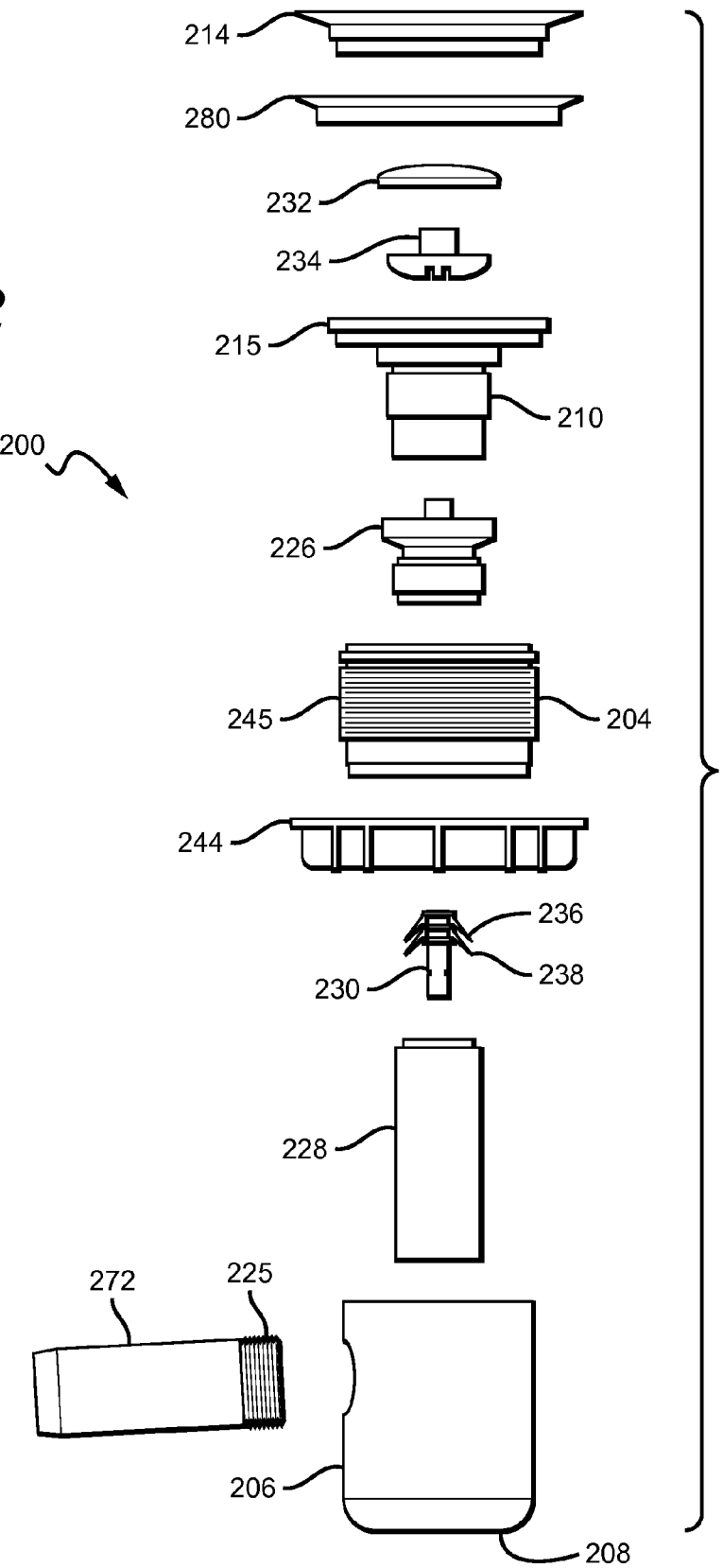

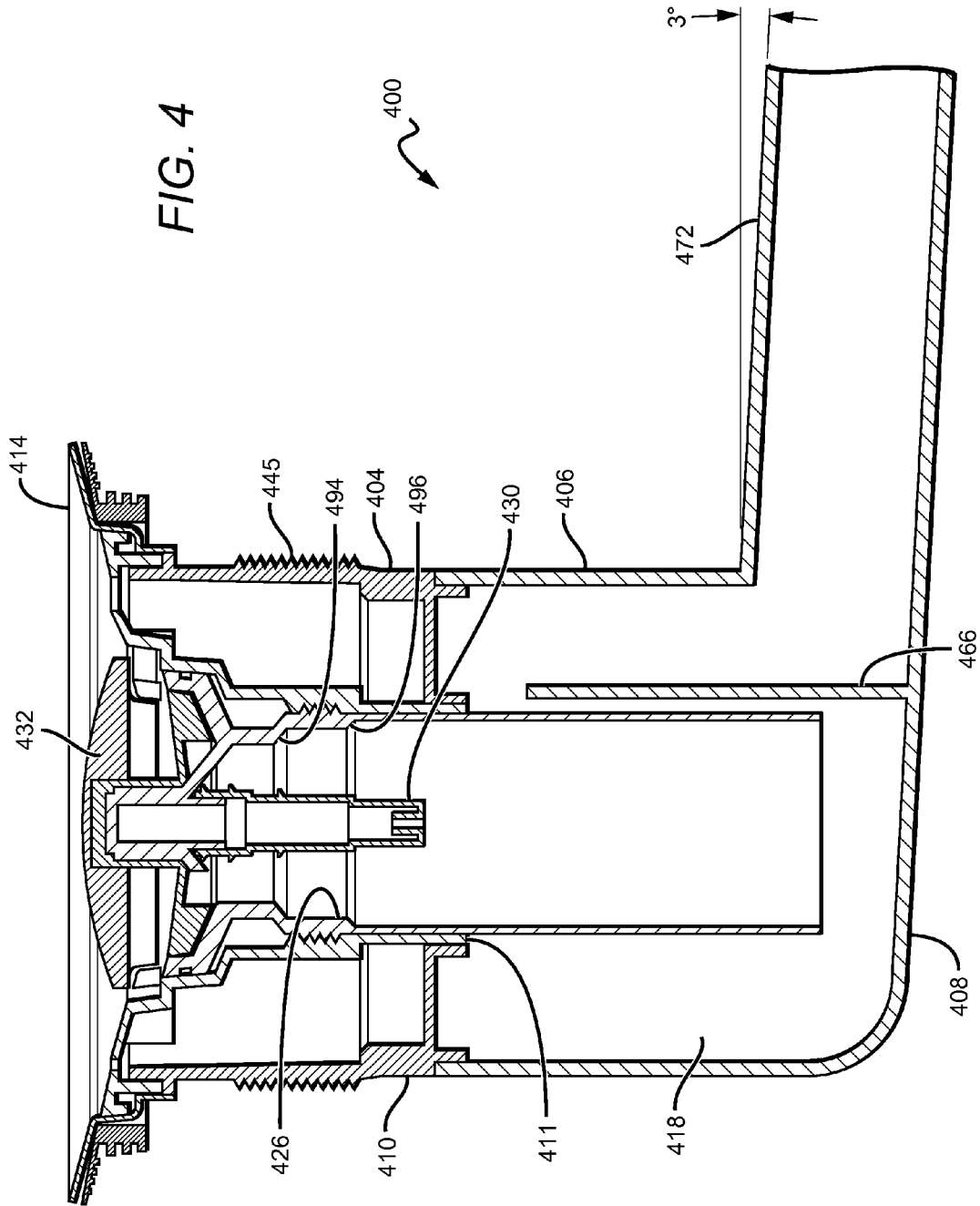

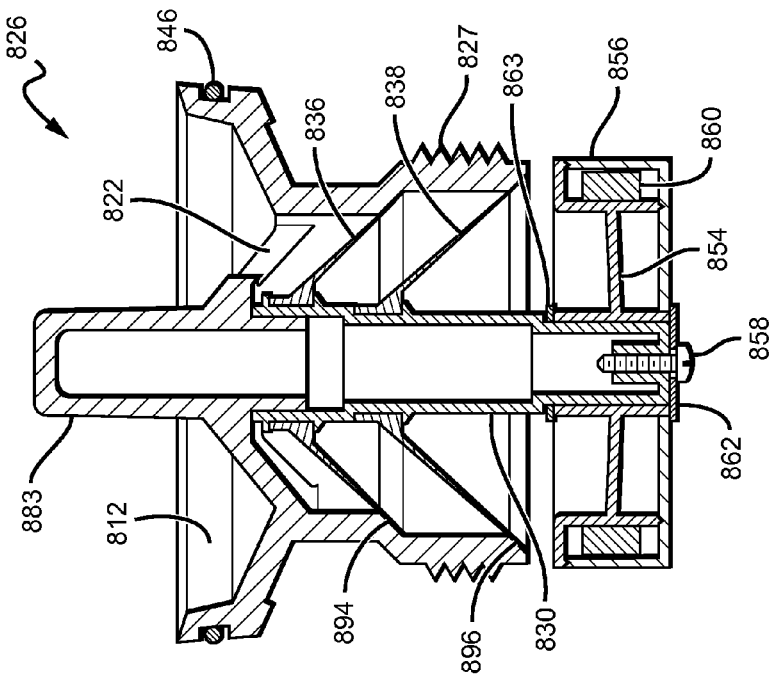
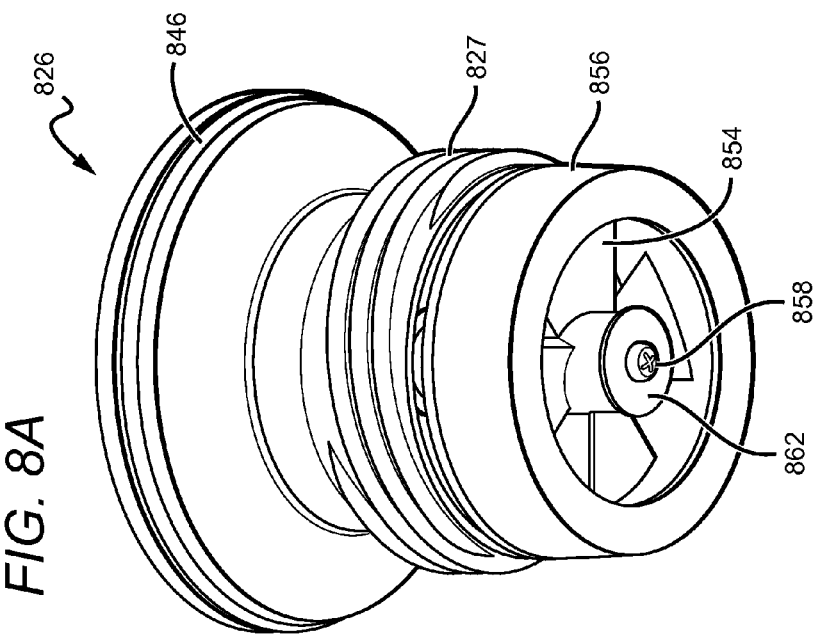

DRAIN CARTRIDGE HAVING REMOVABLE VALVED SYSTEM

This application is a continuation-in-part of U.S. utility application of 12/765,123 filed Apr. 22, 2010 which claims priority to U.S. provisional applications having Ser. No. 61/175,705 filed on May 5, 2009, Ser. No. 61/175,831 filed on May 6, 2009, Ser. No. 61/177,150 filed on May 11, 2009, Ser. No. 61/262,981 filed on Nov. 20, 2009, and Ser. No. 61/289,633 filed on Dec. 23, 2009.

This application is also a continuation-in-part of U.S. patent application Ser. No. 12/154,891 filed on May 28, 2008, which claims priority to U.S. provisional patent application with Ser. No. 60/932,700 filed on Jun. 1, 2007. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is drains.

BACKGROUND

Current sanitation codes require urinals and other drains to provide a seal to contain gases and odors that develop in the drain system. Typical seals include the well known P-traps or S-traps, in which a residual portion of the flushing water forms a seal that effectively locks in odors from downstream of the seal. The upward surface of the seal communicates freely with the environment, which often requires frequent flushing to eliminate residual urine and prevent any odors emanating from the seals. Because of the need for frequent flushing, large amounts of water are often consumed, which can be problematic especially in areas with limited or no access to water.

"Waterless" or "water-free" urinals are becoming necessities as a result of the growing concern to limit unnecessary water usage. With an increasing emphasis on water conservation, there is heightened interest in toilets and urinals designed to minimize the amount of water used.

Various forms of waterless urinals are known that utilize cartridges having oil or other low-density sealants to prevent odors from emanating from the drain pipe. Exemplary patents include U.S. Pat. No. 5,711,037 to Reichardt et al., U.S. Pat. No. 6,053,197 to Gorges, U.S. Pat. No. 6,644,339 to Gorges et al., U.S. Pat. No. 6,959,723 to Gorges, and U.S. Pat. No. 6,973,939 to Gorges et al. The oil-based sealants float on a body of trapped residual urine and thereby serve as an odor barrier, which allows entering urine to immediately permeate downwardly through the sealant and proceed to a drain, while preventing odors from emanating through the seal.

The low-density sealant in these cartridges remains open to the atmosphere, which can be problematic as the sealant is depleted, and odors begin to permeate through the seal. In addition, these cartridges typically require periodic replacement, which can add significantly to the waterless urinals' cost, especially in high traffic areas such as airports and stadiums. In addition, removal of the cartridges generally requires a special tool, gloves, and masks. Furthermore, the used cartridges are often hazardous and require properly disposal.

In addition to chemical sealants, it is known to utilize a duck bill valve that opens from the weight of the fluid. See, for example, U.S. Pat. No. 6,401,266 to Mitchell et al.; U.S. Pat. Appl. No. 2006/0010565 to Cummings (publ. May 2006); U.S. Pat. Appl. No. 2006/0207005 to Janssen (publ. September 2006); and WIPO Patent Appl. No. 2009/040524 to McAlpine (publ. April 2009). However, such valved systems typically retain a small amount of fluid in the valves after each use, which can cause odors to emanate from the valves. In addition, the valves are generally prone to freezing in cold regions, and sticking. In addition, the systems utilize only a single valve, which can be problematic if the valve is stuck open due to sticking or freezing, debris, or otherwise.

U.S. Pat. No. 6,286,153 to Keller discusses a urinal cartridge that includes an electrically operated float valve. The Keller system also utilizes only a single valve and therefore suffers from the disadvantages discussed above.

It is also known to use an umbrella valve in a urinal. See, for example, U.S. Pat. No. 4,180,875 to Wilson, which discusses a urine disposal bypass unit having a one-way valve. The Wilson system is problematic as the system also utilizes a single valve. In addition, the system lacks a removable core and therefore increases the time and cost for cleaning and maintenance of the valve and bypass unit.

Thus, there is still a need for a mechanism for a waterless urinal that operates in a closed system and without the need for a chemical sealant.

SUMMARY OF THE INVENTION

The inventive subject matter provides apparatus, systems and methods in which a cartridge is presented that is sized and dimensioned to be received with a drain. As used herein, the term "drain" means a fluid outlet such as that found in urinals, sinks, tubs, floor drains, or other drains through which fluid can flow. The cartridge can advantageously replace other waterless urinal cartridges including, for example, those having oil or other low-density sealants. The cartridge can include one or more valves that advantageously eliminate the need for flushing water, while avoiding the problems associated with cartridges having low-density sealants. Advantageously, and in contrast to current waterless urinal cartridges having a low-density sealant, the cartridge can be used in urinals and other drains that utilize water to flush the drain, or chemicals to clean the drain housing and cartridge, without degradation of the valves or odor seal.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

Contemplated cartridges have a housing, and preferably have an insert that is user-removable from the housing. The housing and the insert could be inner and outer chambers, upper and lower chambers, or left and right chambers, respectively, or other commercially suitable configuration(s). In some contemplated embodiments, the cartridge housing can comprise an upper housing.

It is especially preferred that the one or more valves can be gravity flow valves configured to be biased in a closed position, and at least partially opened by a pressure of a fluid against a surface of the valve. Such valves advantageously can operate without electricity, and function to create a closed system, where the valves close automatically once the fluid passes by the valves. However, in other contemplated embodiments, at least one of the valves could be an electrically operated valve including, for example, by using a solenoid, a vibrator, or other commercially suitable devices. An exemplary discussion of a cartridge that utilizes a solenoid valve is discussed in U.S. Patent Appl. No. 2008/0295233 filed on May 28, 2008. The one or more valves can be used to regulate any commercially suitable fluid including, for example, water, urine, and combinations thereof.

As used herein, the term "gravity flow valve" means a valve in which the fluid flows through the valve primarily as a result of the force of gravity. As used herein, the term "electrically operated" means using electricity to assist or control the opening and closing of one or more valves. Thus, for example, an electrically controlled valve can include a solenoid, and an electrically assisted valve can include a gravity flow valve that is assisted in opening by use of a vibrator, a motor to drive an air Multiplier™ or traditional fan, or other electrical device. As used herein, the term "vibrator" is defined as any device that causes a vibration within the cartridge including, for example, turbines with offset weights, vibrating motors, and/or any combination(s) thereof.

Preferred valves can be skirt valves, which possess numerous advantages over known one way valves such as umbrella valves and duckbill valves. For example, the skirt valve can be mounted about a stem or post to create a 360 degree opening that is less likely to be jammed by solid items. In addition, the skirt valve typically lacks a spoke to hold the center of the valve in place, and therefore lacks the problems associated with the spokes catching foreign objects. Furthermore, the skirt valve can have a thicker first portion that is coupled to a stem or post of the cartridge, and a thinner second portion that allows for greater flexibility of the valve. In this manner, the skirt valve can be (1) much more rigid than an umbrella valve to (a) keep the valve closed when not in use and (b) prevent back pressure in the drain pipe from opening the valve, while (2) the ends of the skirt valve are flexible to allow for fluid flow.

The valves can have a flexible, synthetic membrane that opens when a pressure on an upper surface of the valve exceeds a predetermined threshold. This is beneficial because the valves open when fluid is present on the surface of the valve, but otherwise remain closed. The valves advantageously allow urine or other fluid to pass through to a drain pipe while preventing potential sewer gas from permeating into a facility room or other environment. In addition, the valves can help prevent backflow in the drain pipe from causing damage, since the increased pressure downstream of the valves would force the valves closed and thereby prevent the backflow from exiting through the cartridge. In addition to skirt valves, it is contemplated that any commercially suitable valve(s) could be used including, for example, duck bill valves and umbrella valves. Alternatively, at least one valve could be a non-gravity flow valve including, for example, mechanical check valves and other one-way valves, ball valves, gate valves, and any other commercially suitable valve(s) and combination(s) thereof.

In some contemplated embodiments, the one or more valves can be disposed within a user-removable insert of the cartridge. In this manner, a user can easily access the drain pipe coupled to the cartridge by simply removing the insert, such as to eliminate any blockages found therein. This allows for a plumber's snake or other tool to be ran through the cartridge without requiring removal of the cartridge itself. In addition, disposed the valves within the insert provides easy access for cleaning and maintenance of the valves.

As a further protection against odors escaping from a drain pipe, the cartridge can be fluidly coupled to a P-trap or other fluid trap to provide an additional drain seal. In preferred embodiments, the fluid trap can be at least partially disposed within the cartridge. In certain contemplated embodiments, the fluid trap can be at least partially formed from insertion of the insert into the cartridge.

To prevent unauthorized removal of the cartridge or the insert, the cartridge could include a locking mechanism attached to the underside of a cover to form a keyhole. The cover can have a plurality of openings through which fluid can flow. The locking mechanism can be coupled to at least two, and preferably four, locking bars that each engages an aperture within the cartridge wall to prevent removal of the cover. Springs can be coupled to the locking mechanism in a normally closed/locked position, such that the mechanism remains locked until the force of a key turning in the key hole deforms the springs and unlocks the locking mechanism. The locking mechanism could alternatively be coupled to a drain wall rather than the cartridge. Preferably, the cover and locking mechanism are composed of stainless steel, although other metals and non-metals are also contemplated.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1B is a vertical cross-sectional view of the cartridge of FIG. 1A including valves and a drain pipe.

FIG. 2 is an exploded view of another embodiment of a cartridge.

FIG. 4 is a vertical cross-sectional view of still another embodiment of a cartridge.

FIG. 8A is a bottom perspective view of yet another embodiment of an insert of a cartridge.

FIG. 8B is a vertical cross-sectional view of the insert of FIG. 8A.

DETAILED DESCRIPTION

Figure 1A:
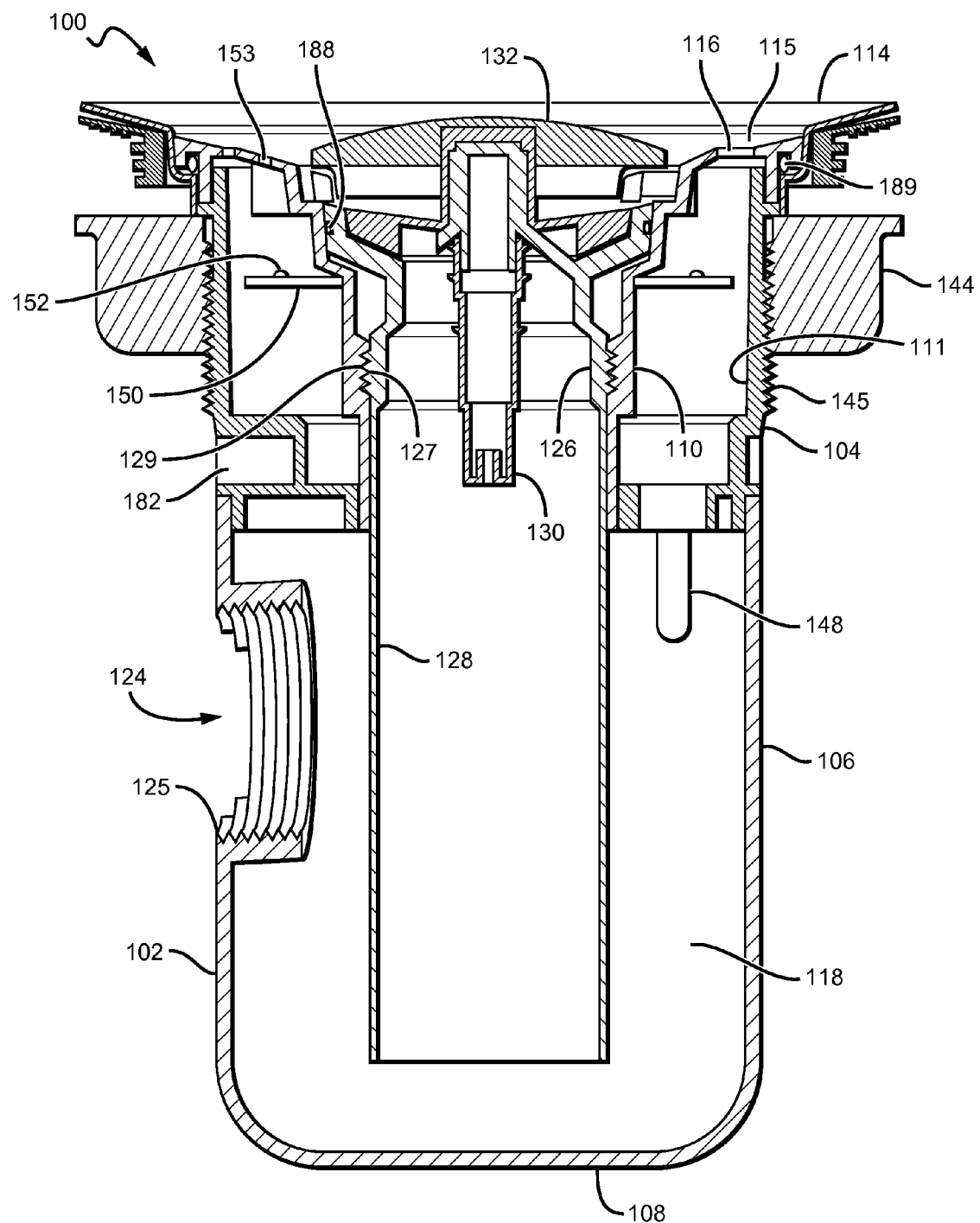
FIG. 1A is a vertical cross-sectional view of one embodiment of a cartridge.

In FIGS. 1A-1B, a cartridge 100 is shown that regulates a fluid flow and has a housing 102 that comprises an upper housing 104, a lower section 106, and bottom 108. The upper housing 104 can comprise inner and outer portions 110 and 111, respectively, although it is contemplated that the upper housing 104 can comprise a single piece. The upper housing 104 and the lower section 106 of the housing 102 can be fixedly coupled by one or more fastener(s) including, for example, adhesive or other glues, threads or other mechanical fasteners, and combination(s) thereof. Insert 126 can be at least partially disposed within the upper housing 104, and configured to be user-removable from the upper housing 104. Each of the upper housing 104, the insert 126, and the lower section 106 can be composed of any commercially suitable material(s) including, for example, plastics and other polycarbonates, metal, quartz, porcelain, and any combination(s) thereof.

Cartridge 100 is preferably sized and dimensioned to fit within a drain recess, including, for example, drains found in sinks, floor drains and male or female urinals. Although the cartridge 100 preferably has a horizontal cross-section that is cylindrical in shape, the shape of cartridge 100 can be varied to correspond to the drain's shape. Alternatively, an adapter (not shown) can be used to adapt the cartridge 100 to the drain's shape. The top of cartridge 100 can be tapered inwardly and downwardly to facilitate fluid flow to opening 122.

Cartridge 100 can include an outwardly projecting flange 114 that can be used to allow the cartridge 100 to rest on a portion of a drain. Optionally, a pliable plastic or elastomeric seal ring 180 can be disposed about the cartridge 100 and underneath the flange 114 to create a fluid seal. Flange 114 can be composed of stainless steel or other metal or metal composites, or other commercially suitable materials or combination(s) thereof. An upper surface 115 of the cartridge 100 can rest upon flange 114, and include an O-ring 189 or other elastomeric seal ring to create a fluid seal between cartridge 100 and flange 114. The outer portion 111 can include a threaded portion 145 onto which a nut 144 or other securing means can be coupled to the cartridge 100. Thus, for example, the cartridge 100 could be inserted into a drain, and then the nut 144 can be tightened until cartridge 100 is secured in place with respect to the drain.

The insert 126 can include threads 127 that are configured to engage with threads 129 disposed on the inner portion 110 of upper housing 104. In this manner, the insert 126 can be removably threaded and thereby secured or removed from, the upper housing 104. However, other commercially suitable fasteners could be substituted for threads 127 and 129 such that the insert 126 can be removably inserted within upper housing 104. To ensure an effective seal is maintained between the upper housing 104 and insert 126, respectively, one or more O-rings 188 or other commercially suitable flexible seals can be disposed about insert 126. Alternatively, such flexible seal could be coupled to upper housing 104.

Although the insert 126 can be disposed in an approximately central location of the upper housing 104, the insert 126 can alternatively be disposed off-centered to provide space on upper surface 115 for a character display (not shown) that can display video, images, and/or text.

Cartridge 100 can include at least one valve 136, and preferably includes first and second valves 136 and 138. Contrary to prior art systems having a single valve including, for example, U.S. Pat. No. 6,401,266 to Mitchell et al.; U.S. Pat. Appl. No. 2006/0010565 to Cummings (publ. May 2006); U.S. Pat. Appl. No. 2006/0207005 to Janssen (publ. September 2006); and WIPO Patent Appl. No. 2009/040524 to McAlpine (publ. April 2009), the present cartridge utilizes at least two valves and thereby provides additional protection against the escape of odors from a drain pipe. For example, even if the primary first valve 136 was somehow stuck open by a toothpick or other debris, the secondary valve 138 would still prevent odors from escaping the drain pipe.

Figure 16A:
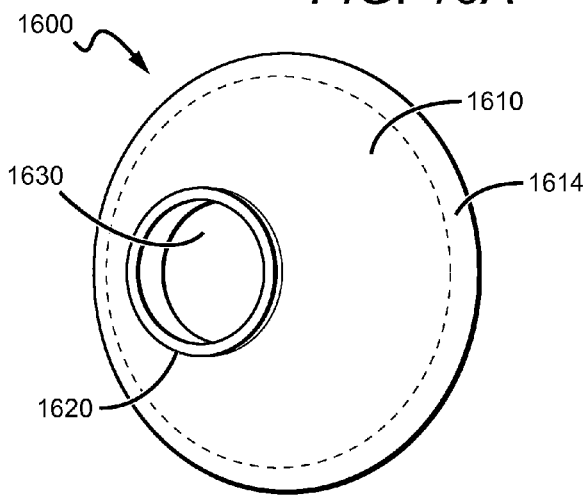
FIGS. 16A-16B are top and bottom perspective views, respectively, of an embodiment of a skirt valve.
Figure 16B:
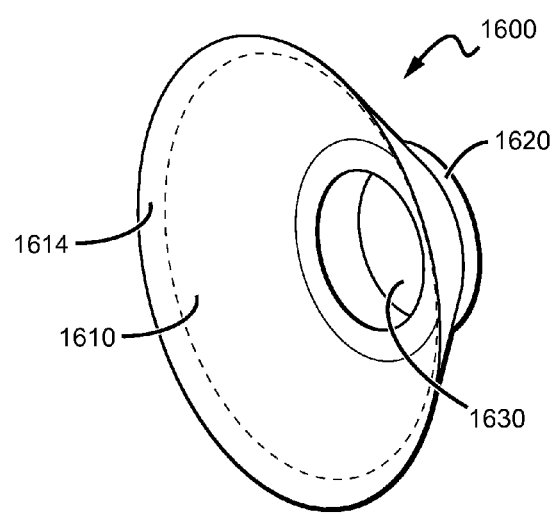
Figure 16C:
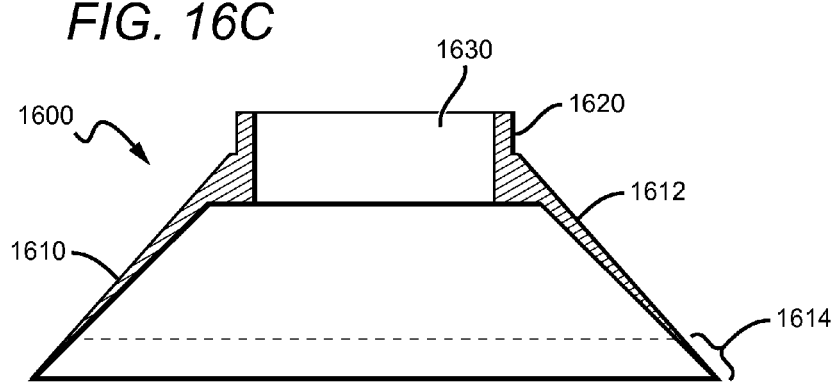
FIG. 16C is a cross-sectional view of the skirt valve of FIGS. 16A-16B.

Preferred valves comprise gravity flow valves that are biased closed such that the valves 136 and 138 are closed when not in use. Each of valves 136 and 138 can comprise a skirt valve, although other commercially suitable gravity flow valves could alternatively be used including, for example, umbrella valves, duck bill valves, and other flexible valves. An exemplary embodiment of a skirt valve is shown in FIGS. 16A-16C. Skirt valves are defined to include a rim extending from a core of the skirt valve where the rim comprises a rigid portion with a flexible tip. At least one of the valves 136 and 138 could alternatively be a non-gravity flow valve including, for example, needle valves, ball valves, gate valves, poppet valves, plug valves, globe valves, butterfly valves, and diaphragm valves.

The valves 136 and 138 can have a flexible, synthetic membrane that can comprise any commercially suitable material(s) including, for example, silicon fabric or other synthetic and/or flexible materials, or combinations thereof, which provide protection to the valves from significant damage or degradation by urine fluids and cleaning solvents. The valves thereby advantageously allow urine to pass through to the drain line without allowing odors to permeate up from the drain line.

The second valve 138 can be disposed downstream of the first valve 136. In preferred embodiments, the first and second valves 136 and 138 are separated by a distance less than or equal to six inches, and more preferably, less than or equal to three inches, as shown in FIG. 1A. All commercially suitable configurations are contemplated for the first and second valves 136 and 138, and preferably, the valves 136 and 138 are biased to be convex in the upstream direction. Preferably, the first valve 136 is more rigid than the second valve 138.

The valves 136 and 138 are preferably disposed within insert 126, which advantageously allows the valves 136 and 138 to be removed for cleaning or replacement without necessitating removal of the cartridge 100. In this manner, an interior of the insert 126 can define a passageway configured to allow fluid to flow from the first valve 136 to the second valve 138. However, it is also contemplated that at least one of valves 136 and 138 could be disposed elsewhere within cartridge 100. It is especially preferred that the valves 136 and 138 can be disposed such that an end portion of each of valves 136 and 138 is seated beneath first and second sloped portions 194 and 196 of an interior of insert 126. In this manner, any backflow or pressure beneath the valves 136 and 138 will keep the valves 136 and 138 pressed against the wall of the insert 126, and thus the valves 136 and 138 can remain sealed.

Each of valves 136 and 138 have a varying thickness along its respective radius, such that each of valves 136 and 138 is sufficiently thin at respective outer 5 mm edge intervals 137A and 139A to allow even small amounts of urine or wastewater to pass through valves 136 and 138, while retaining sufficient strength for durability at the inner portions 137B and 139B, respectively. In preferred embodiments, the outer 5 mm edge interval 137A of the first (upper) valve 136 has a first average thickness that is less than 95% of a second average thickness of the outer 5 mm edge interval 139A of the second (lower) valve 138. It is also contemplated that the first average thickness of the outer edge interval could be less than 90%, 85%, 80%, 75%, or 70% of the second average thickness of the second outer 5 mm edge interval 139A. It is further contemplated that the edge interval of the valve could be the outer 1 mm, 3 mm, 7 mm, 10 mm, 15 mm, 20 mm, and so forth, of the valve and will likely depend upon the size and dimension of the valve, and the fluid that the valve regulates. The width of the outer edge intervals 137A and 139A will likely be proportional to the overall width of the valve.

As used herein, the term "outer 5 mm edge interval" means the portion extending from the outer edge of the valve inwards by a distance of 5 mm. For example, the outer 5 mm edge interval of a circular valve having a radius (r) of 20 mm is the outer 15-20 mm from a center of the circular valve, or an area represented by the formula: $(\pi * r^2)-(\pi *(r-5)^2)$. In this example, the area would be approximately 549.8 mm. Similarly, the term "outer 1 mm edge interval" means the outer 1 mm edge portion extending about an exterior of the valve. One of ordinary skill in the art would of course understand that square, ovular, and other commercially suitable sizes and dimensions of valves could alternatively be used, and the outer x edge interval would still be applicable.

The thinner first valve 136 advantageously ensures that urine will easily flow past the first valve 136 and eliminate residual odors, while the thicker second valve 138 ensures that the second valve will remain sealed even if there is backflow or back pressure downstream of the second valve 136. Each of the valves 136 and 138 can be anchored at a center portion of the valves 136 and 138 to a stem 130. In this manner, ribs are not needed to anchor the valves 136 and 138, and therefore solids such as cigarettes, chewing gum, and coins are less likely to clog the cartridge 100.

Cartridge 100 can further include a fluid trap 118 that is fluidly coupled to cartridge 100. Preferably, the fluid trap 118 is at least partially disposed within the cartridge 100, and more preferably, in the lower section 106 as shown in FIGS. 1A-1B. The insert 126 can include an extended portion 128 that can be affixed to the insert 126, such that fluid trap 118 is created when the insert 126 is inserted within the cartridge 100. Alternatively, the insert 126 can comprise a single piece that includes extended portion 128. The fluid trap 118 can also be permanently formed within the cartridge 100 by use of a baffle or wall-like structure, as shown in FIG. 4. For configurations in which the insert 126 is removably threaded into the cartridge 100, the extended portion 128 is advantageous because the additional length assists in preventing cross-threading of the insert 126 when it is inserted into cartridge 100.

Fluid trap 118 acts as a further barrier against odors emanating from the drain pipe in addition to first and second valves 136 and 138. Thus, cartridge 100 can have triple means of protection against odors. In addition, the fluid trap 118 can help prevent the possibility of backflow from the drain pipe exiting through cartridge 100 because any backflow would increase the pressure downstream of the valves 136 and 138 and thereby keeping them closed. This is particularly beneficial for urinals and floor drains, because these drains are disposed near or at ground level and are often the first drains to experience problems with backflow.

Fluid outlet 124 can be fluidly coupled to the fluid trap 118 in the lower section 106, such that excess fluid can exit the fluid trap 118 through a drain pipe 172. The drain pipe 172 can be removably coupled to the cartridge 100 using threads 125 or other commercially suitably fasteners. Alternatively, the drain pipe 172 could be permanently affixed to the cartridge 100. The drain pipe 172 can be coupled to the cartridge 100 in any viable location.

The insert 126 can have a stem 130 to which a cap 132 and valves 136 and 138 can be coupled. Alternatively, cap 132 can be coupled to the upper housing 104. Cap 132 preferably has a downwardly tapered outer perimeter that facilities fluid flow to opening 122, and can be sized and dimensioned to limit splash back of liquid hitting cap 132. In some contemplated embodiments, the cap 132 can have a tamper proof configuration to help prevent unauthorized removal of the insert 126 and cap 132.

As shown in FIG. 1B, the cartridge 100 can include an optional grate or other debris collecting screen member 134 having a plurality of holes such that screen member 134 can filter objects flowing through insert 126, and thereby limit the size of objects that can reach valves 136 and 138. The screen member 134 is preferably disposed between the cap 132 and the valves 136 and 138, although it is contemplated that the screen member 134 could be disposed outside of the insert 126 as well. Optionally, the screen member 134 can function as a tool to assist in removing the insert 126 from the upper housing 104.

An ultraviolet ("UV") light emitter 148 can be disposed within the cartridge 100. Preferably, the UV light emitter 148 is disposed such that ultraviolet light can be radiated on at least a portion of cartridge 100, and more preferably, at least a portion of a fluid passageway within cartridge 100 to thereby help disinfect that portion. Although the UV light emitter 148 is shown disposed within cartridge 100, it is contemplated that the UV light emitter 148 might be disposed adjacent to the cartridge such as that shown in FIG. 10A. Contemplated UV light emitters can emit UV light having a wavelength between 10 nm to 400 nm, more preferably between 100 to 300 nm, and most preferably between 220 to 270 nm.

In addition to the UV light, the cartridge 100 can include one or more LEDs or other commercially suitable light emitters 152 disposed to illuminate the cartridge 100, and preferably, a surrounding area of the cartridge 100. One or more of the light emitters 152 can emit light with a different predominant wavelength from the other light emitters 152, and preferably the light emitters 152 each predominantly emits a wavelength of light that differs by at least 50 nm from the wavelength of light predominantly emitted by the other light emitter. As used herein, the terms "predominant" and "predominantly" refer to the peak intensity of a band of wavelengths emitted by a light source. Preferred colors include green or blue, though specific colors could be chosen to match the aesthetics of the environment where the cartridge 100 is placed. Emitting distinct wavelengths of colors is advantageous as the color of light emitted by the light emitters 152 could be directed to change randomly, periodically, upon an external signal such as that of a remote computer, or upon the occurrence of one or more triggering events including, for example, detection of users, fluids, music or other sounds, or any combinations thereof.

In some contemplated embodiments, the cartridge 100 can include a character display that can present text, pictures, video, or other media or combinations thereof. Though the display is preferably composed of organic LEDs (OLEDs), all commercially suitable displays are contemplated. Thus, for example, it is contemplated that the cartridge 100 could display one or more phrases or sentences, whether scrolling or stationary, including for example, news, an establishment's specials, random facts, etc. In addition, the display could include a game that is played by a user. Such displays can preferably be disposed on an upper surface 115 of upper housing 104, or cap 132.

Although the light emitters 152 are preferably disposed within upper housing 104, it is contemplated that the light emitters 152 could additionally or alternatively be disposed externally to the cartridge 100. For example, one or more light emitters could be disposed beneath the cartridge 100 that is composed of a luminescent plastic or other translucent or transparent material(s), such that the light emitted from the light emitters 152 could be radiated through the cartridge 100.

The upper surface 115 can include a translucent or transparent portion 116 such that light from light emitters 152 can be radiated through transparent portion 116 and outside of cartridge 100. The translucent or transparent portion 116 can be fabricated from any commercially suitable material(s), and preferred materials include acrylic or other translucent or transparent plastics. Although transparent portion 116 can be sized and dimensioned to create a ring-shape about the opening 122, all configurations are contemplated.

The light emitters 152 can be disposed on, or otherwise coupled to, a controller board 150, which preferably has at least partial control over at least one of light emitters 152, UV light emitter 148, and other electrical components of cartridge 100. The controller board 150 can be connected to the light emitters 152, UV light emitter 148, and other electrical components by a wireless connection such as WIFI, Bluetooth, infrared, or radio frequency, although wired connections are preferred. As needed, the cartridge 100 can include any necessary electronics, wiring, or circuitry to enable such wired or wireless connections with the controller board 150. In preferred embodiments, the controller board 150 has a ring-shape and is disposed within the upper housing 104, although the controller board 150 can have any commercially suitable size and dimension such that the controller board 150 can be disposed within the cartridge 100. Alternatively, the controller board 150 could be disposed externally to the cartridge in a separate housing, for example.

The controller board 150 can comprise circuitry, and in some embodiments can include a processor and memory to run and store software instructions, respectively, such that the UV light emitter 148, the light emitters 152, and/or other components of the cartridge 100 can be controlled. For example, the controller board 150 might activate the light emitters 152 and/or UV light emitter 148 at a predetermined interval (e.g., every minute, every hour, every day, etc.). More preferably, the controller board 150 could activate the light emitters 152 and/or UV light emitter 148 when the controller board 150 receives a signal from a sensor 153 that monitors for the presence of a person or fluid. Alternatively or additionally, the light emitters 152 and/or UV light emitter 148 could be activated for a continuous period such as during business hours, or for an amount of time after a user or fluid is no longer detected by a sensor 153.

It is contemplated that the controller board 150 can include electronics that allow the controller board 150 to receive control signals from a remote monitor or other device via Ethernet, USB, serial, IP over power line or other commercially suitable wired connections, Bluetooth, wireless USB, RF, IR, or other commercially suitable wireless connections, or combination(s) thereof. For example, the controller board 150 could receive control signals from a remote computer (not shown) that directly or indirectly activates the UV light emitter 148, light emitters 152, and/or other components of the cartridge 100. In embodiments of the cartridge 100 that include a display, the remote device could communicate with the controller board 150 to change a text or image that is shown on the display, or possibly change the color of light emitted by light emitters 152.

All commercially suitable sensors are contemplated including, for example, fluid sensors, temperature sensors, infrared sensors, optical sensors, capacitive sensors, proximity sensors, pressure sensors, inductive sensors, and/or combinations thereof. Although the sensor 153 is shown embedded into the portion 116, the sensor 153 or an additional sensor could be located in any suitable location within the cartridge 100 provided the sensor can detect the presence of at least one of a fluid and a user. Alternatively, the sensor 153 could be disposed externally to the cartridge 100. Sensor 153 preferably communicates directly with the controller board 150, through indirect communication is also contemplated, such as by way of one or more intermediate components (not shown). Though preferred sensors 153 communicate over a wired connection, wireless connections are also contemplated.

Figure 9:
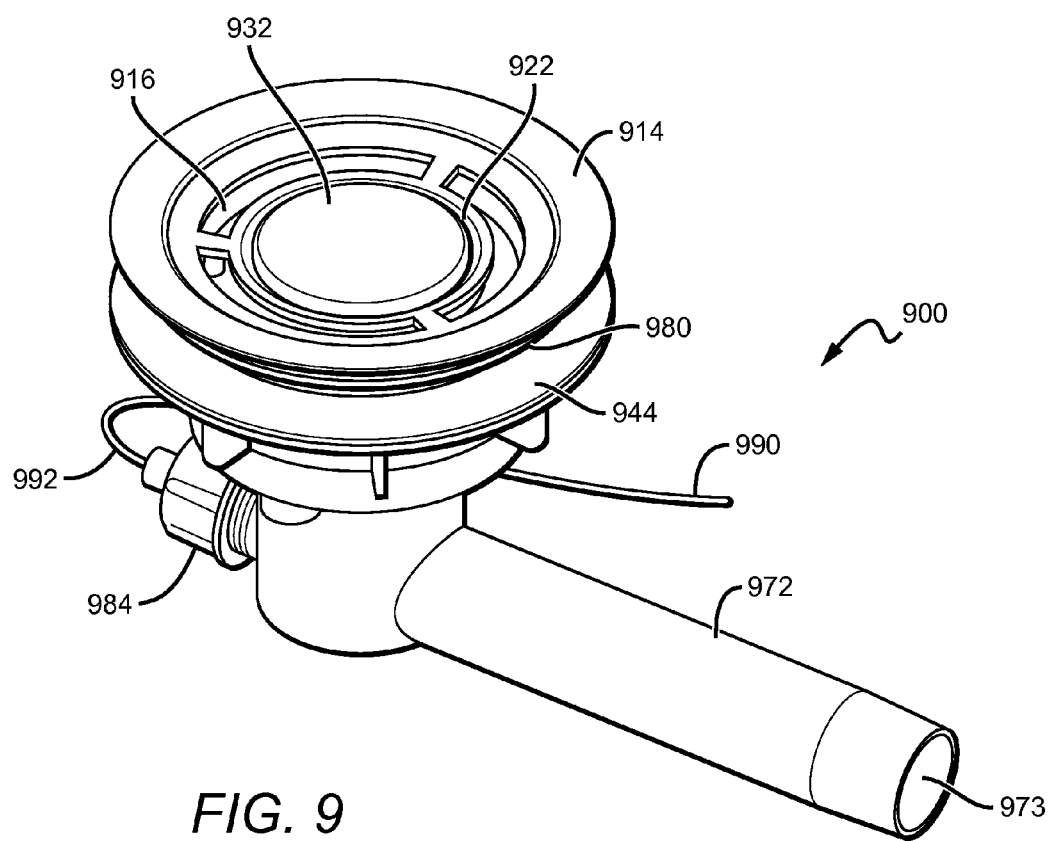
FIG. 9 is a top perspective view of an alternative embodiment of a cartridge coupled to a drain pipe.

Cartridge 100 can include a built-in power station 182 having a battery or coupled to a photovoltaic cell, or be coupled to a line voltage of other external power source shown in FIG. 9. The cartridge 100 can alternatively be wirelessly coupled to an external power source using power station 182 that receives power through, for example, induction, WiTricity™, or other wireless power source(s). This advantageously allows the cartridge 100 to receive power without the need for new wiring, which can thereby reduce the time and cost of installation. Preferred photovoltaic cells are disposed on cap 132 or other object of manufacture, and can optionally be coupled to a battery configured to store excess power from the cell to provide power when the cell lacks sufficient light to produce power.

FIG. 2 illustrates an exploded view of an alternative embodiment of a cartridge 200. With respect to the remaining numerals in FIG. 2, the same considerations for like components with like numerals of FIG. 1 apply.

Figure 3A:
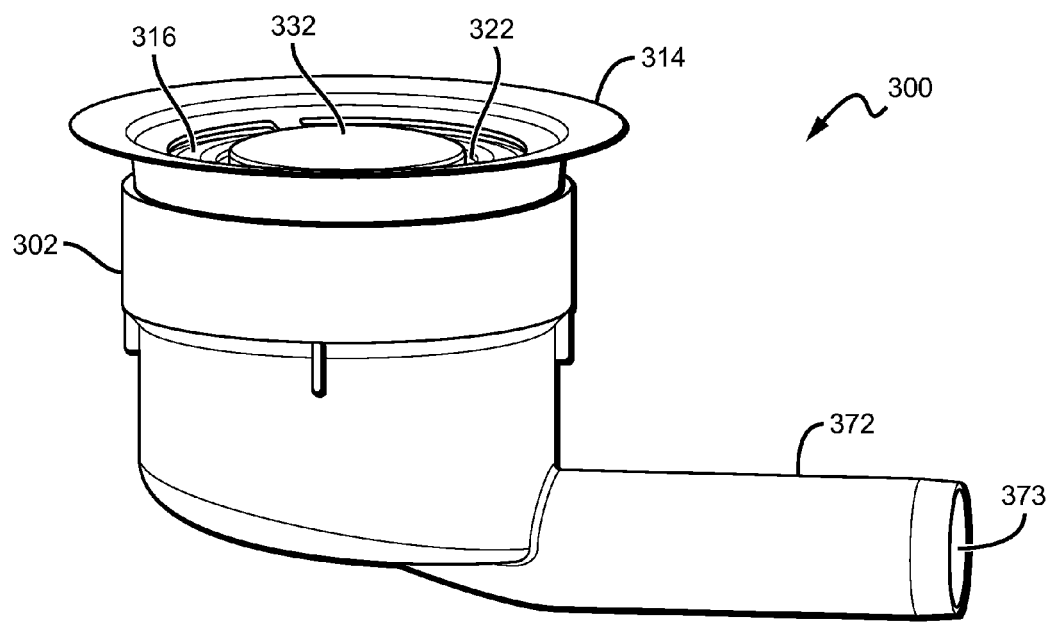
FIG. 3A is a perspective view of yet another embodiment of a cartridge.
Figure 3B:
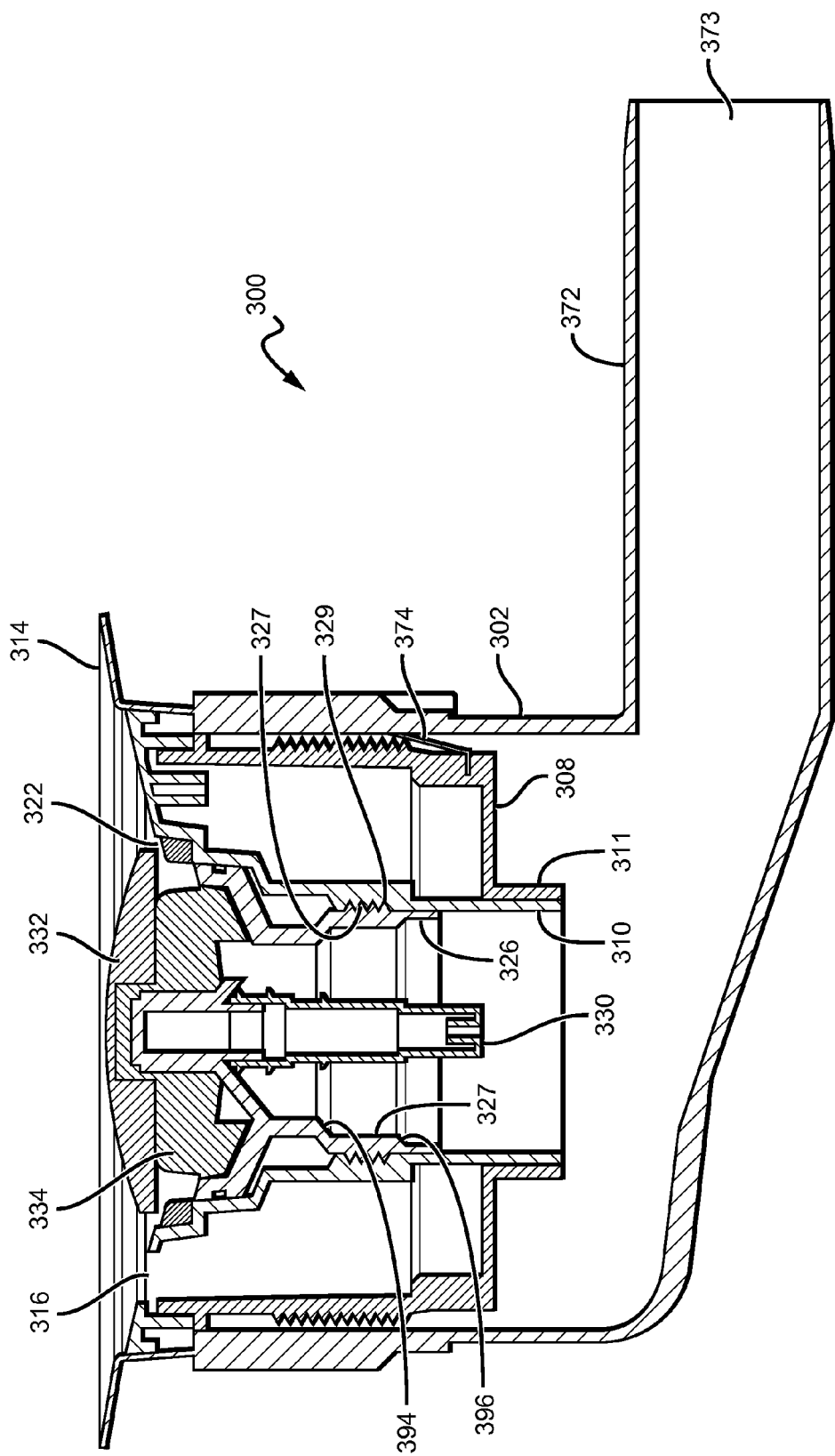
FIG. 3B is a vertical cross-sectional view of the cartridge of FIG. 3A.
Figure 3C:
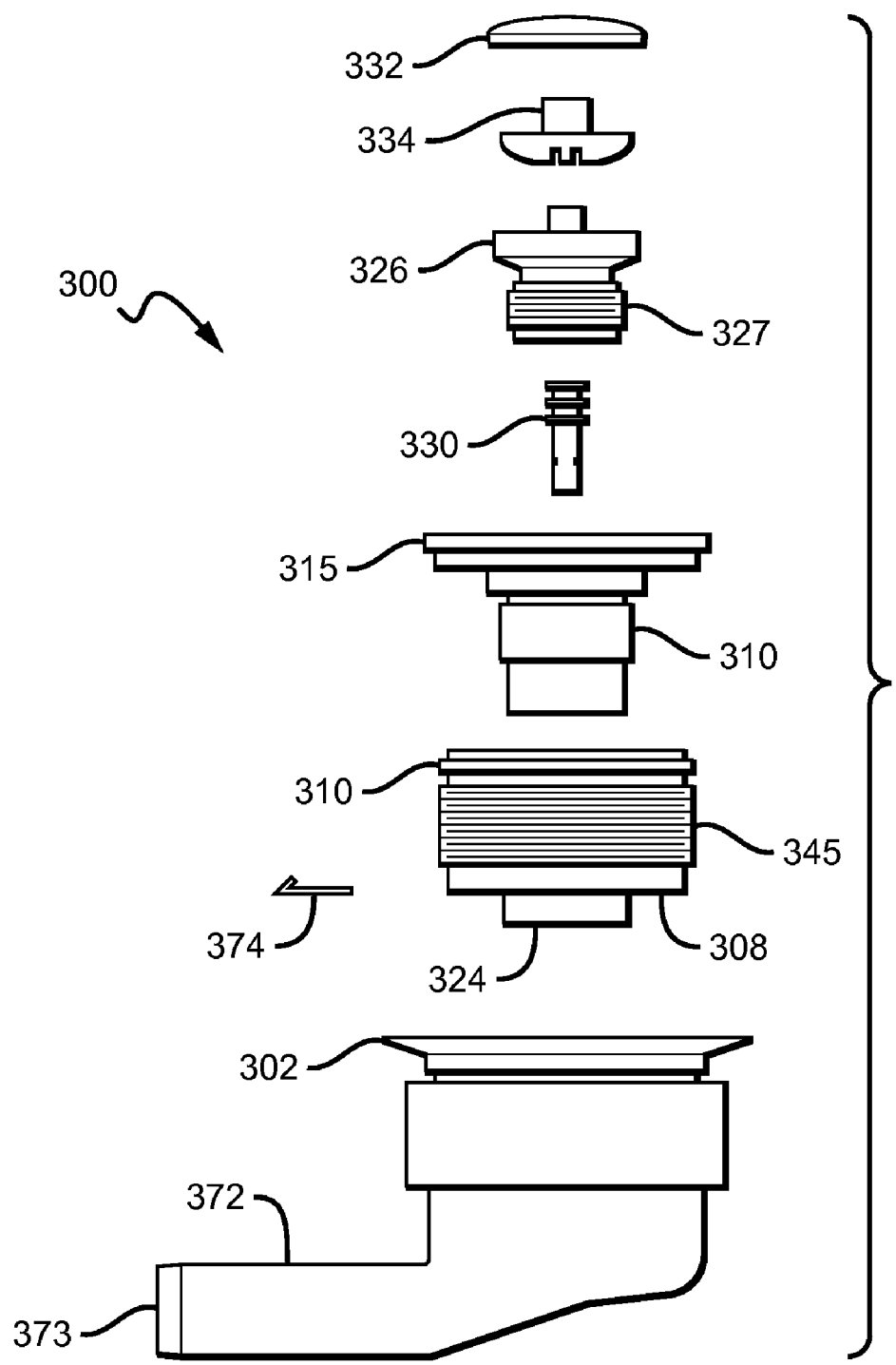
FIG. 3C is an exploded view of the cartridge of FIG. 3A.

In FIGS. 3A-3C, another embodiment of a cartridge 300 is shown that can be inserted into an existing drain housing 302 having an outlet pipe 372 and a drain outlet 373 that can be coupled to a drain pipe (not shown). The cartridge 300 can simply be inserted into the existing drain housing 302 and thereby replace a previously installed drain cartridge (not shown). In such embodiment, fluid can flow through opening 322 and through the insert 326 and pass by optional valves (not shown). The fluid can then exit cartridge 300 though opening 324, and into outlet pipe 372.

To prevent removal of the cartridge 300 from the existing drain housing 302, one or more barbs 374, and preferably at least 3 barbs 374 can be at least partially inserted into the cartridge 300. In this manner, should someone attempt to remove cartridge 300 from existing drain housing 302, the barbs 374 would dig into an inner portion of existing drain housing 302 and thereby inhibit removal of cartridge 300. Contemplated barbs 374 can be composed of stainless steel or any other commercially suitable material(s) such that the barbs 374 have sufficient strength to withstand an applied force of at least 10 N and resist removal of the cartridge 300. With respect to the remaining numerals in each of FIGS. 3A-3C, the same considerations for like components with like numerals of FIG. 1 apply.

FIG. 4 illustrates an embodiment of a cartridge 400 in which drain outlet 472 is disposed at a lower portion of lower section 406. The drain outlet 472 can be angled off normal with respect to the wall of lower section 406. Preferably, drain outlet 472 is angled to be three degrees off normal with respect to the wall of lower section 406, although other angles could be used to facilitate fluid flow from the lower section 406. The lower section 406 can include a baffle 466 or other dividing structure such that a fluid trap 118 can be created within the lower section 406. With respect to the remaining numerals in FIG. 4, the same considerations for like components with like numerals of FIG. 1 apply.

Figure 5A:
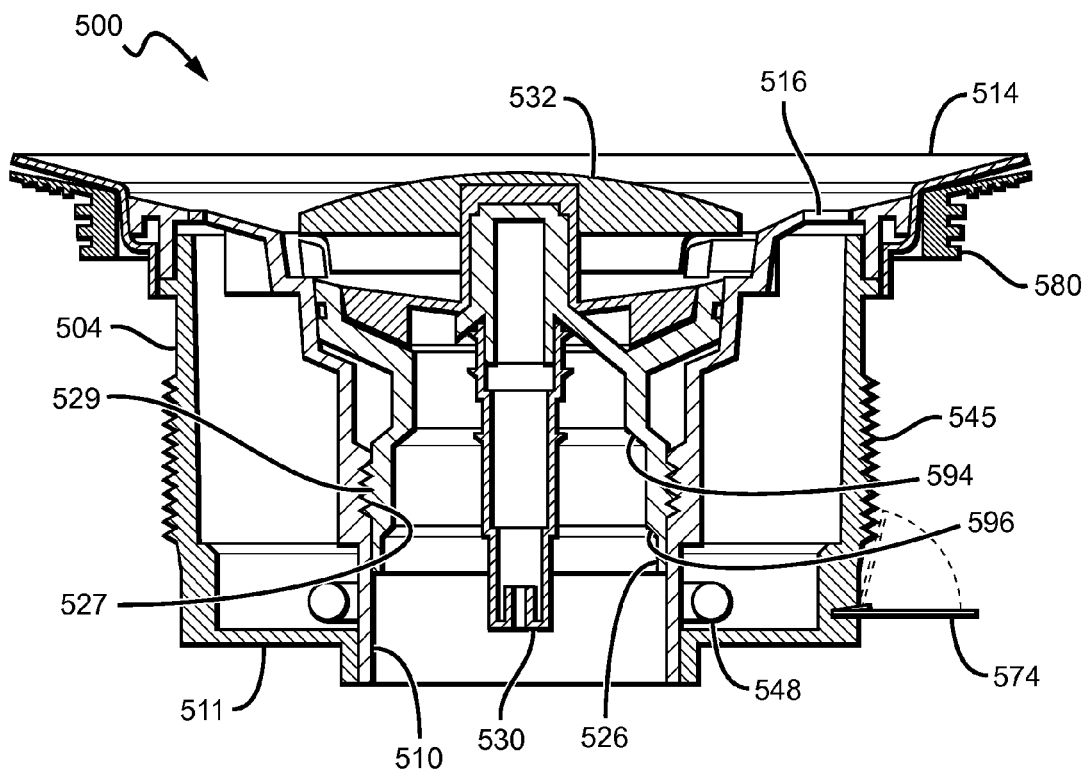
FIGS. 5A-5B are vertical cross-sectional views of a cartridge having a locking device.
Figure 5B:
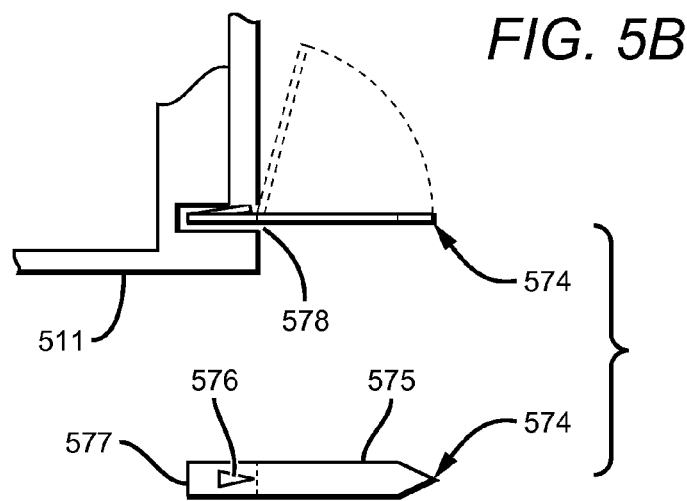

In another embodiment of a cartridge 500 shown in FIGS. 5A-5B, the cartridge 500 can have one or more barbs 574 that can be inserted into a wall 511 of cartridge housing 504. The barbs 574 can have first and second portions 575 and 577, respectively, with the first portion 575 being pivotable with respect to the second portion 577 as shown in FIG. 5B. The first portion 575 can include a pointed tip configured to dig into an inner portion of a drain housing shown in FIG. 3B. The second portion 577 can include a raised tip 576 configured to dig into a portion of the wall 511 to prevent removal of the barb 574 from wall 511.

The cartridge can also include a circular UV lamp 548, although other configurations of UV lamps are contemplated including, for example, LEDs that produce UV light. To enable UV lamp 548 to radiate UV light on an internal portion of the insert 526, the inner wall 510 of the housing 504, an optionally, the insert 526, can be composed of one or more translucent or transparent material(s). With respect to the remaining numerals in FIGS. 5A-5B, the same considerations for like components with like numerals of FIG. 1 apply.

Figure 7:
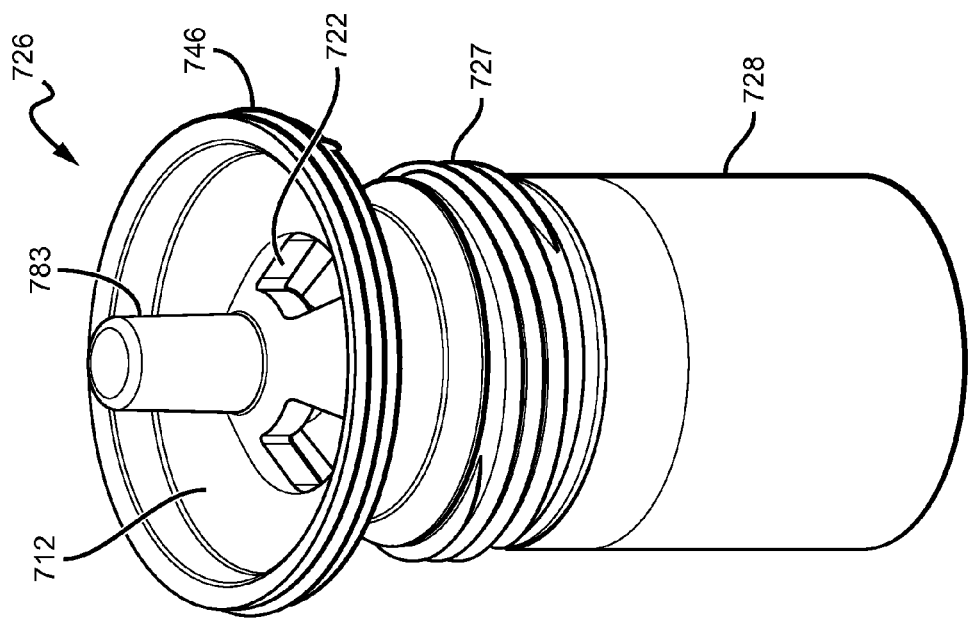
FIG. 7 is a side perspective view of another embodiment of an insert of a cartridge.
Figure 6:
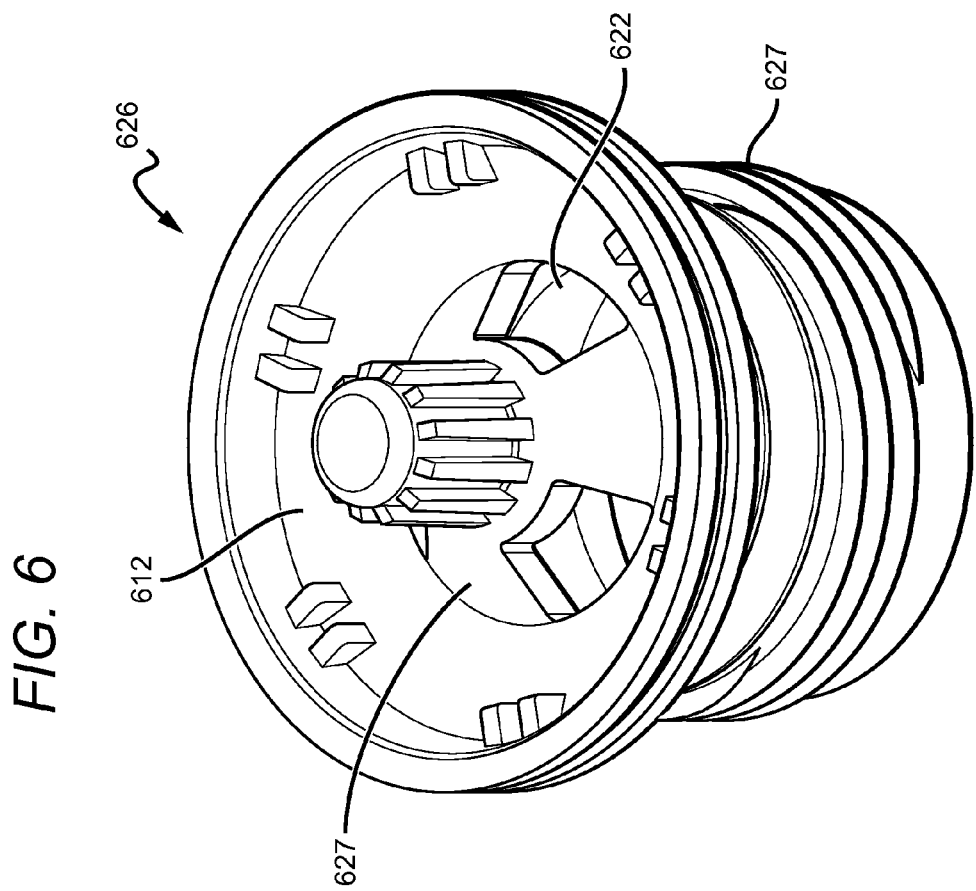
FIG. 6 is a top perspective view of an insert of a cartridge.

In FIG. 6, an embodiment of an insert 626 is shown that includes openings 622 disposed on a slanted upper surface 627 of insert 626. It is contemplated that the top 612 of insert 626 can be downwardly sloped to direct fluid toward openings 622. FIG. 7 illustrates an alternate embodiment of an insert 726 that includes extended portion 728. With respect to the remaining numerals in each of FIGS. 6-7, the same considerations for like components with like numerals of FIG. 1 apply.

Figure 8C:
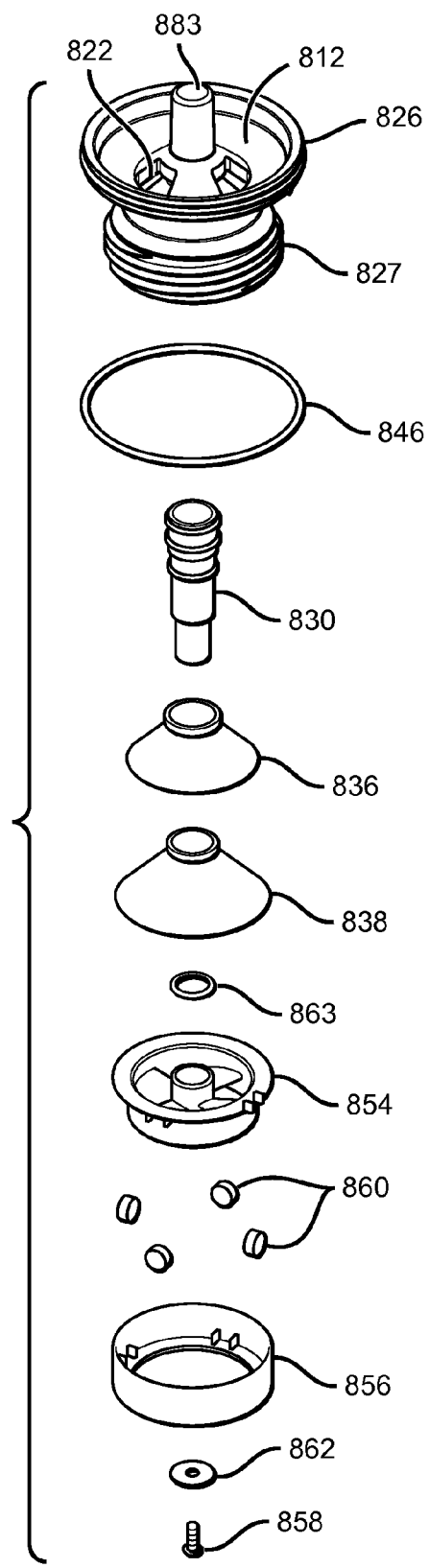
FIG. 8C is an exploded view of the insert of FIG. 8A.

FIGS. 8A-8C illustrate yet another embodiment of an insert 826 that includes a rotor section 856 having blades 854 that can rotate with the rotor section 856. Preferably, the rotor section 856 is disposed downstream of valves 836 and 838. The rotor section 856 can be secured to a stem 830 of insert 826 using a screw or other commercially suitable fastener 858 such that the rotor section 856 can rotate about stem 830. Optionally, a bearing 862 can be inserted between the blades 854 and fastener 858. In addition, a bearing 863 can be inserted between the rotor section 856 and an outwardly protruding portion of stem 830. Rotor section 856 and blades 854 can be composed of any commercially suitable material(s) including, for example, cobalt or other metals, bimetals, strontium ferrite, plastics, composites, and/or any combination(s) thereof.

Figure 10A:
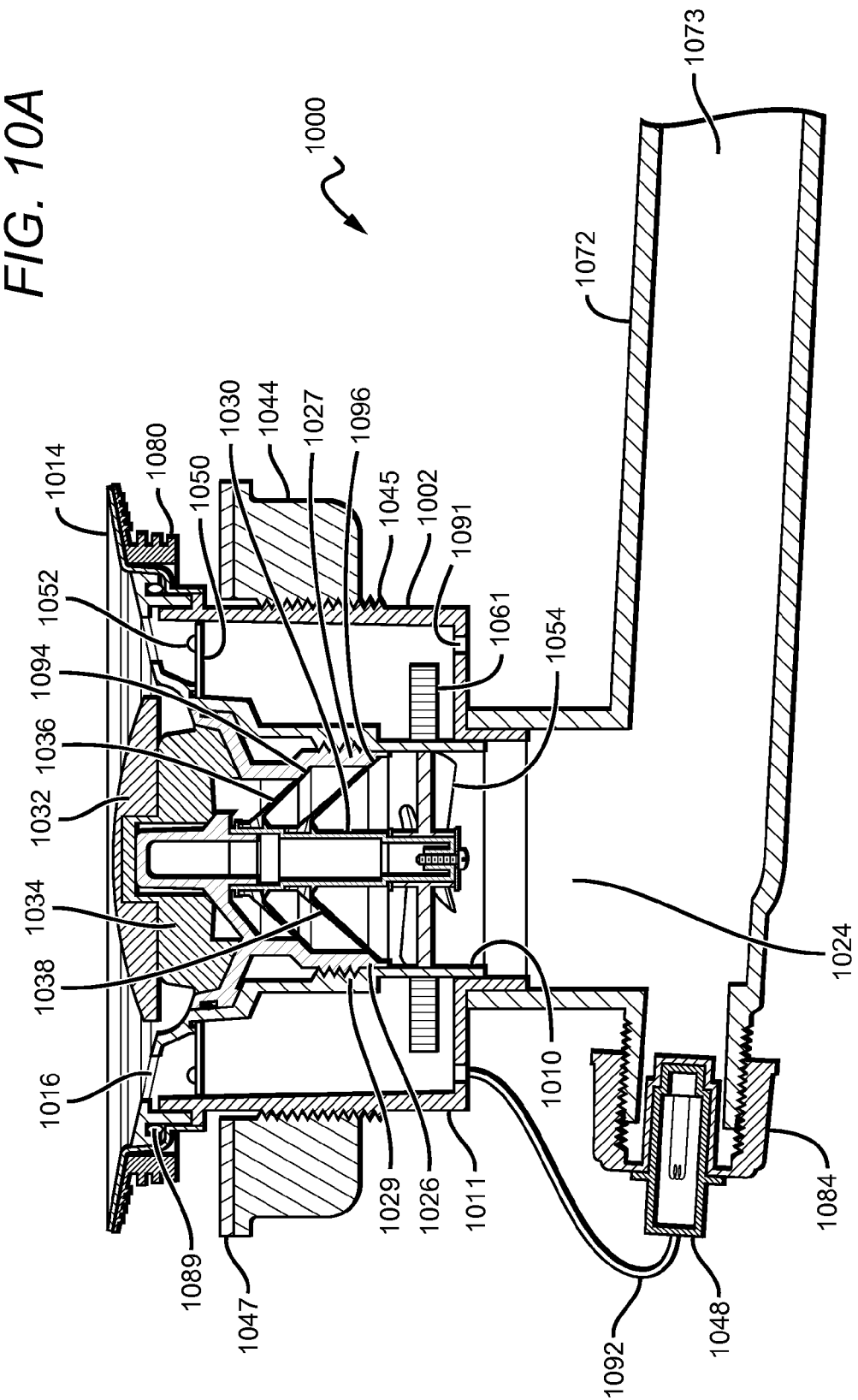
FIG. 10A is a vertical cross-sectional view of another alternative embodiment of a cartridge coupled to a drain pipe.

The rotor section 856 can include one or more magnets 860 that can interact with a magnetic coil disposed within a cartridge (not shown). In this instance, and where other upper limits are not expressly stated, the reader should infer a reasonable upper limit. In this instance, for example, a commercially reasonable upper limit is about eight. This is advantageous as the interaction between the coil and the magnets 860 can cause the rotor section 856 to rotate. Alternatively, the rotor section 856 or blades 854 can be composed of magnetic or magnetizable material. An exemplary embodiment of a coil is shown in FIG. 10A. It is also contemplated that a motor could be disposed within stem 830 or elsewhere within insert 826 to cause rotation of rotor section 856.

Rotation of the rotor section 856 can advantageously cause a negative pressure to develop beneath the valves 836 and 838, and thereby drive an air flow through the insert 826 toward the direction of a drain pipe (not shown) to further prevent odors from escaping from the drain pipe. In some contemplated embodiments, the rotor section 856 can include an offset weight, such that rotation of the rotor section 856 will cause a vibration of the stem 830 and thereby vibrate valves 836 and 838.

The insert 826 can include a spacer 883 to which a cap can be coupled. The spacer 883 is beneficial in that it creates a defined space between a top 812 of insert 826 and a cap (not shown), such that fluid can flow into the insert 826 while restricting larger items from entering the insert 826. With respect to the remaining numerals in each of FIGS. 8A-8C, the same considerations for like components with like numerals of FIG. 1 apply.

In FIG. 9, an embodiment of a cartridge 900 is shown that is inserted into a drain housing 972. A plug 984 containing a UV lamp (not shown) can be coupled to the drain housing 972. A wire 992 can connect the plug 984 to a controller and/or power source disposed within cartridge 900. A second wire 990 can couple the cartridge 900 to an external power source, which advantageously allows electrical components of the cartridge 900 to be powered, while also providing a wired data connection via IP over power or other protocols. However, wireless power and data connections, including as those discussed above, are also contemplated.

The cartridge 900 can include a translucent portion 916 that can have a ring-shape, although other commercially suitable shapes are contemplated. The translucent portion 916 advantageously allows light from one or more light emitters (not shown) to radiate from the cartridge. The cartridge 900 can further include a cap 932 that can help direct fluid to opening 922 in cartridge 900. With respect to the remaining numerals in FIG. 9, the same considerations for like components with like numerals of FIG. 1 apply.

Figure 10B:
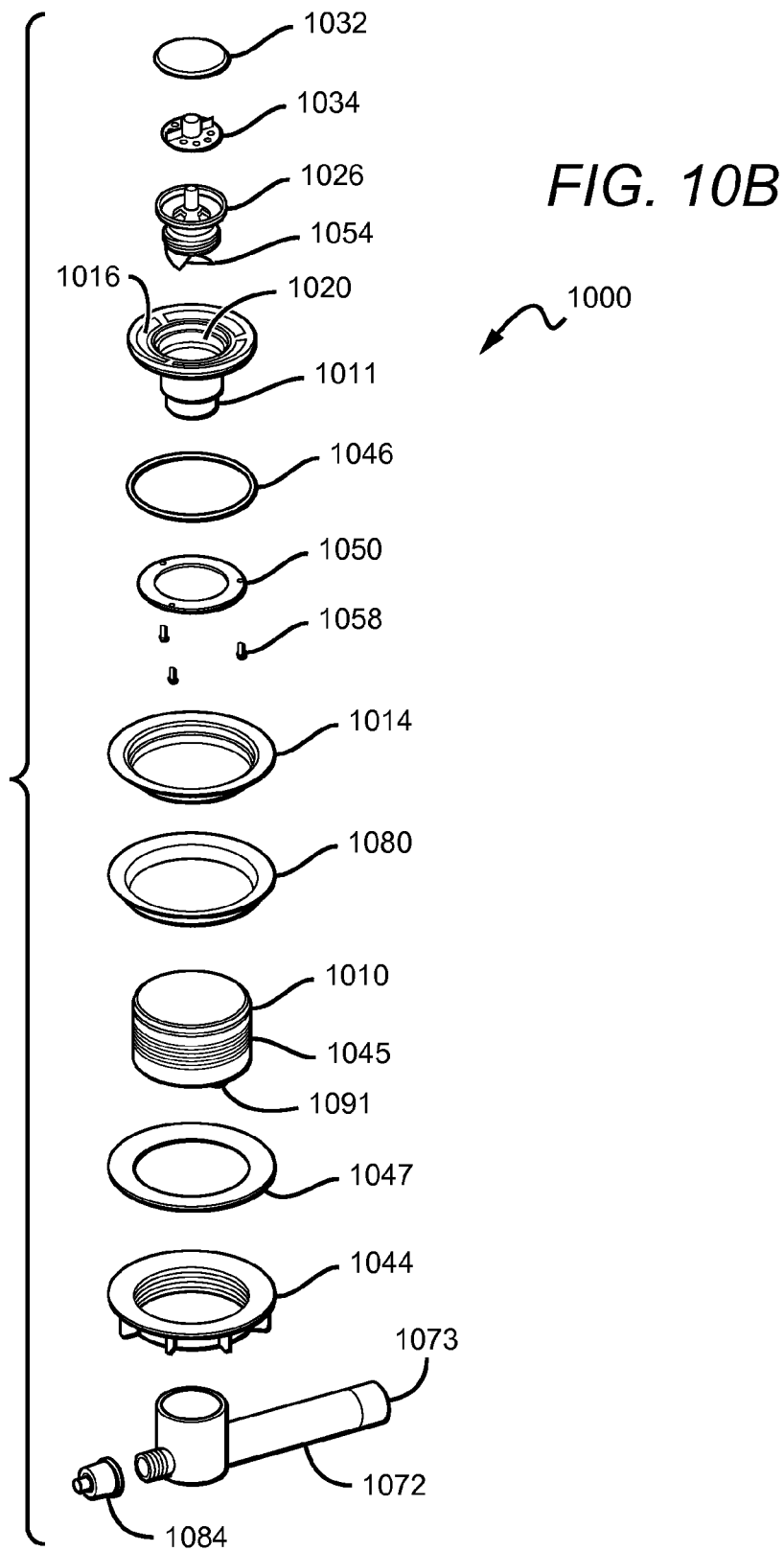
FIG. 10B is an exploded view of the cartridge of FIG. 10A.

In other contemplated embodiments shown in FIGS. 10A-10B, the cartridge 1000 can include blades 1054 that are coupled to the insert 1026 such that the blades 1054 can rotate about a stem 1030 of the insert 1026 similar to the rotation of a motor. Preferred blades 1054 are composed of magnetic or magnetizable materials. However, it is contemplated that the blades 1054 could be composed of a non-magnetic material and include a magnet disposed within the blades 1054. A magnetic coil 1061 can be disposed within housing 1002 such that the coil 1061 can interact with the magnetic blades or magnets to thereby cause the blades 1054 to rotate.

The cartridge 1000 can be coupled to a drain pipe 1072 such that fluid can flow through the cartridge 1000, exit through opening 1024, and flow into drain pipe 1072. The drain pipe 1072 can include a removable plug 1084 having a UV lamp 1048 disposed to irradiate UV light, and thereby help to disinfect, an interior of drain pipe 1072. A cable 1092 or other wiring can connect the UV lamp 1048 to a controller 1050 and/or power source (not shown). The cartridge can further include aperture 1091 through which a cable or other wiring (not shown) can be inserted to provide power and/or data to UV lamp 1048, light emitters 1052, and other electrical components of cartridge 1000. With respect to the remaining numerals in each of FIGS. 10A-10B, the same considerations for like components with like numerals of FIG. 1 apply.

Figure 11:
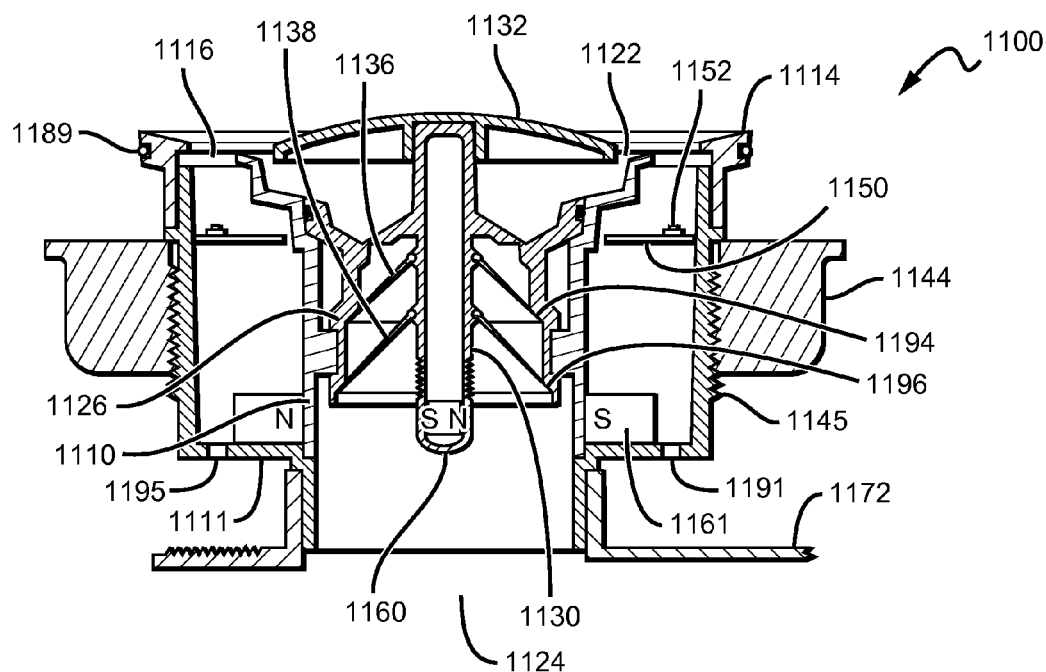
FIG. 11 is a vertical cross-sectional view of one embodiment of a cartridge having a vibrator.

FIG. 11 shows a cartridge 1100 having a vibrator 1160 disposed within a stem 1130 of insert 1126. Preferred vibrators 1160 are magnetically operated, but can additionally or alternatively be mechanically and/or electrically operated. The vibrator 1160 can vibrate at an ultrasonic or any other commercially suitable frequency. The vibrator 1160 can be disposed anywhere in the cartridge 1100, provided the vibrator 1160 can assist in preventing or eliminating fluid build-up on the valves 1136 and 1138.

The cartridge can also include a controller board 1150 configured to operate vibrator 1160 at a predetermined interval (e.g., every minute, every hour, every day, etc.). In addition, the vibrator 1160 could be operated when a sensor (not shown) detects the presence of a user. Alternatively or additionally, the vibrator 1160 could be operated continuously while a user is detected, or for an amount of time once the user leaves. The cartridge 1100 can further include apertures 1191 and 1195 through which wires can be inserted. With respect to the remaining numerals in FIG. 11, the same considerations for like components with like numerals of FIG. 1 apply.

Figure 12:
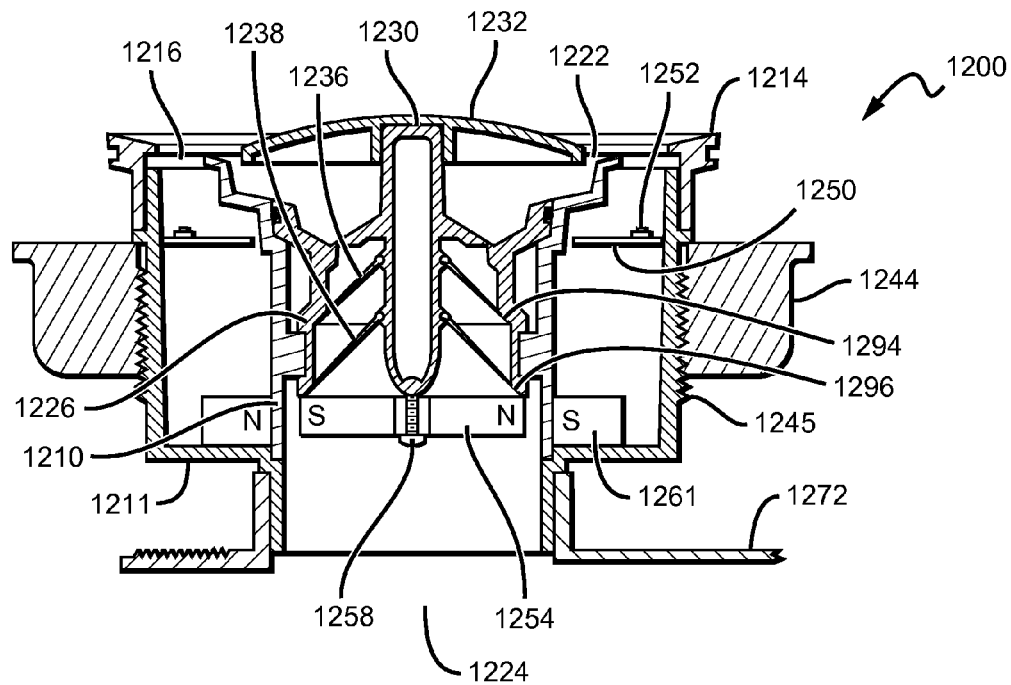
FIG. 12 is a vertical cross-sectional view of one embodiment of a cartridge having a rotor.

In FIG. 12, another embodiment of a cartridge 1200 is shown that has blades 1254 coupled to a stem 1230 of insert 1226 by a screw 1258 or other fastener, such that the blades 1254 can rotate about the stem 1230 of the insert 1226. Preferred blades 1254 are composed of magnetic or magnetizable materials, or otherwise include one or more magnets (not shown) such that the blades can be rotated using a magnetic coil 1261 disposed in the cartridge 1200. With respect to the remaining numerals in FIG. 12, the same considerations for like components with like numerals of FIG. 1 apply.

Figure 13:
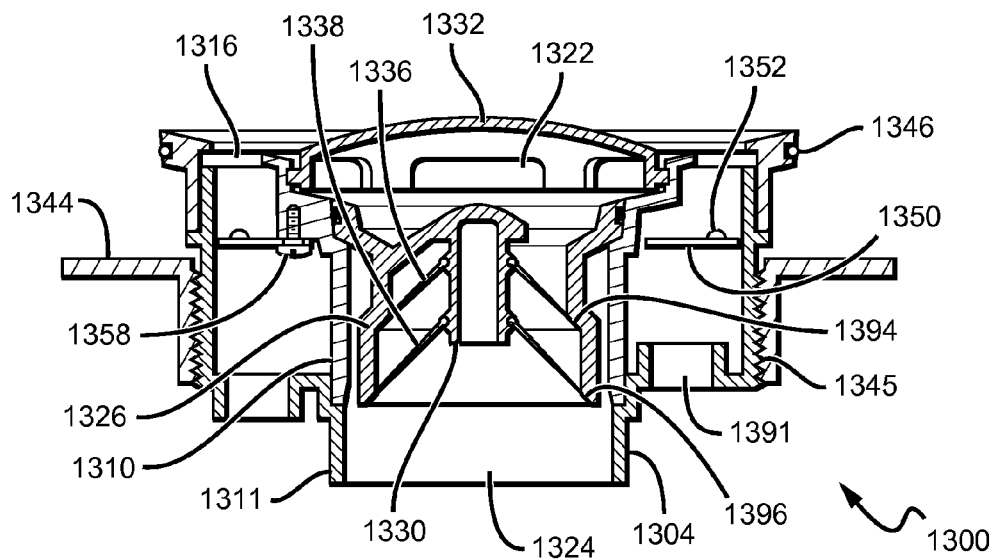
FIG. 13 is a vertical cross-sectional view of another alternative embodiment of a cartridge.

FIG. 13 illustrates a cartridge 1300 in which a circuit board can be coupled to an inner wall 1310 of an upper housing 1304 using a screw 1358 or other commercially suitable fastener(s). With respect to the remaining numerals in FIG. 13, the same considerations for like components with like numerals of FIG. 1 apply.

Figure 14:
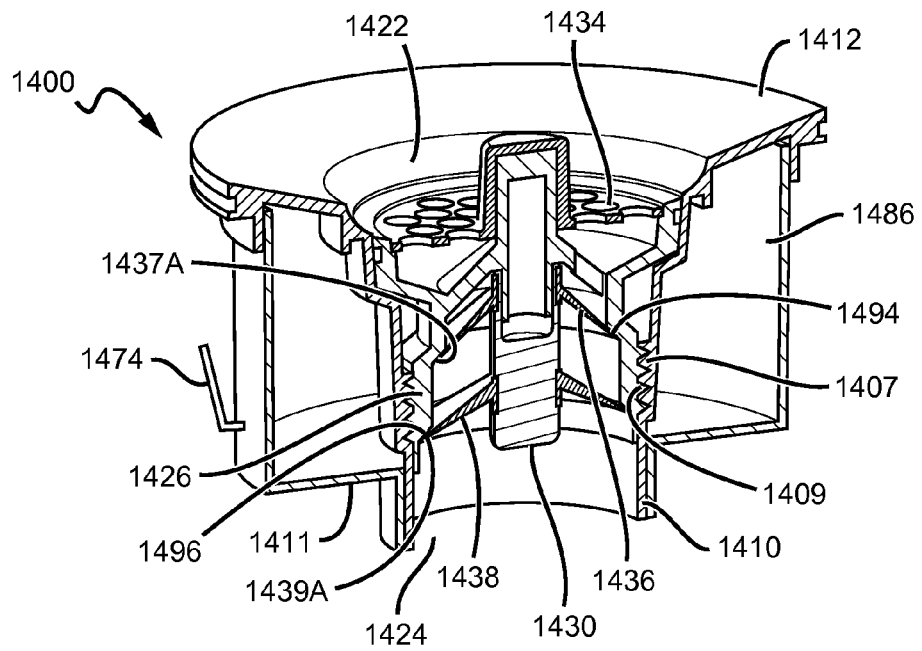
FIG. 14 is a vertical cross-sectional view of still another alternative embodiment of a cartridge.

FIG. 14 illustrates a cartridge 1400 having a screen 1434 or other debris-collecting member can be disposed about a stem 1430 of the insert 1426 to prevent larger items from flowing into the insert 1426. Because the insert 1426 can be quickly removed from the cartridge 1400 as needed, the screen 1434 and insert 1426 can easily be cleaned without removal of the cartridge 1400. The cartridge 1400 can have one or more barbs 1474 that are inserted into an outer wall 1411 of cartridge 1400 to help prevent removal of the cartridge 1400 from a drain housing (not shown). The inner 1410 and outer walls 1411 of the cartridge 1400 can be permanently affixed to one another to create a hermetically-sealed inner portion 1486 into which light emitters, a power supply, a controller and related circuitry, and other electrical components of the cartridge 1400 can be disposed.

The cartridge 1400 can further include first and second valves 1436 and 1438, respectively. Each of the first and second valves can have an outer edge interval 1437A and 1439A, respectively. Preferably, the average thickness of the first outer edge interval 1437A is less than the average thickness of the second outer edge interval 1439A. More preferably, the average thickness of the first outer edge interval 1437A is less than 95%, and most preferably, less than 80% of the average thickness of the second outer edge interval 1439A. With respect to the remaining numerals in FIG. 14, the same considerations for like components with like numerals of FIG. 1 apply.

Figure 15A:
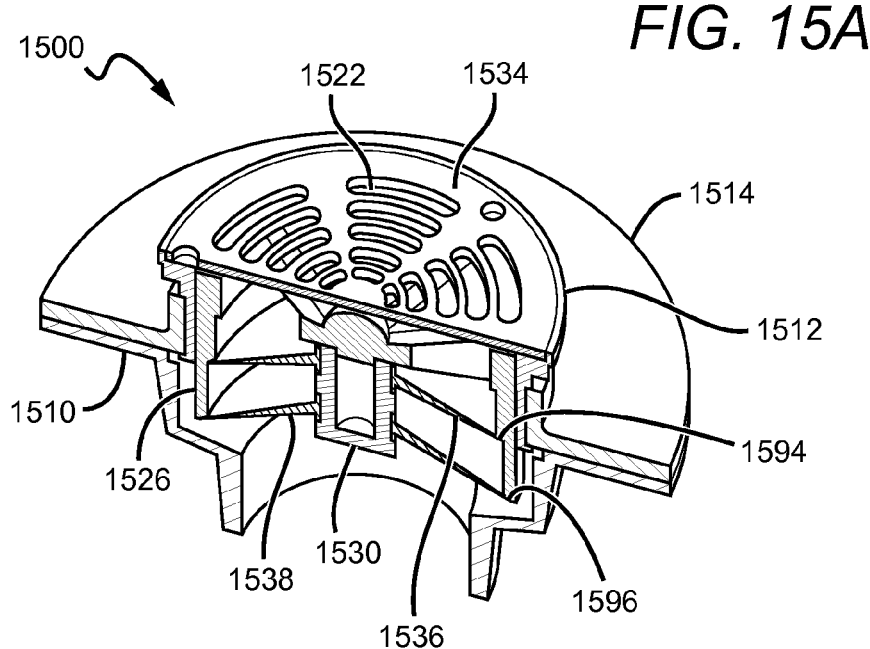
FIGS. 15A-15B are vertical cross-sectional views of one embodiment of a cartridge disposed in a floor drain.
Figure 15B:
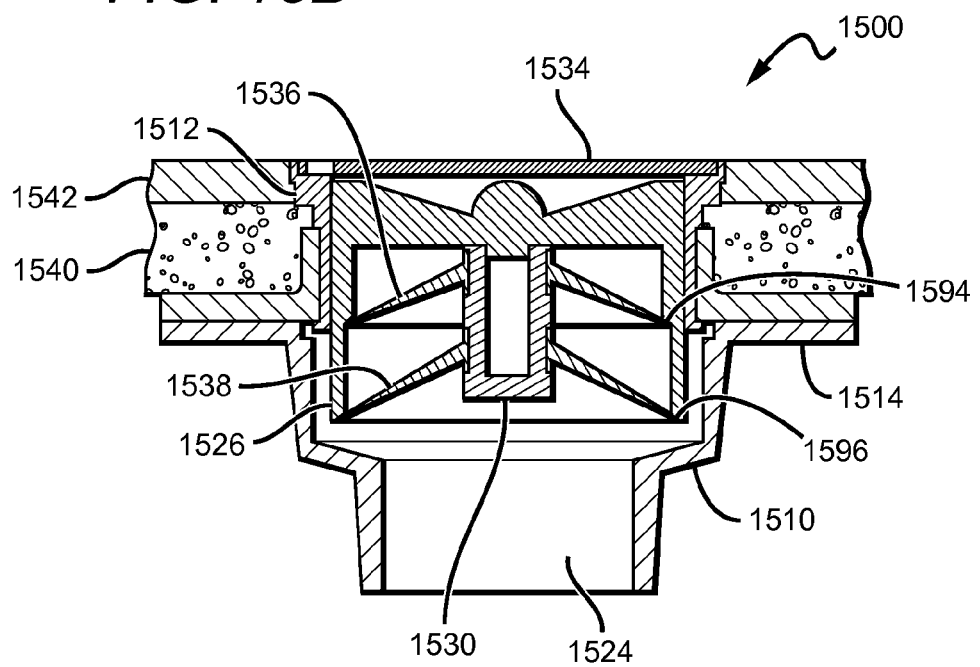

In FIGS. 15A-15B, a floor drain 1500 is shown into which cartridge housing 1526 can be inserted. The floor drain 1500 can comprise a grate 1534 having a plurality of drain openings 1522 through which water or other fluids can flow, and by which solid objects can be filtered from the fluid flow. The grate 1534 can include side 1512 that can be removably coupled to the drain housing 1510 using respective threaded portions or other commercially suitable fasteners.

Cartridge housing 1526 can include first and second gravity flow valves 1536 and 1538, respectively, that are preferably disposed about a stem 1530 of the cartridge housing 1526. In this manner, fluid can flow through openings 1522 into the cartridge housing 1526 and past first and second valves 1536 and 1538, respectively. The fluid can then exit the cartridge housing 1526 through fluid outlet 1524.

As shown in FIG. 15B, the floor drain 1500 can be disposed within a cement floor 1540, such that the grate 1534 can be flush with floor tiles 1542. The housing 1510 of the floor drain 1500 can include an outwardly extending portion 1514 configured to maintain the position of the housing 1510 with respect to the cement 1540. It is contemplated that the stem 1530 can be coupled directly to the grate 1534 such that the cartridge housing 1526 can be eliminated. With respect to the remaining numerals in each of FIG. 15A-15B, the same considerations for like components with like numerals of FIG. 1 apply.

FIGS. 16A-16C illustrate various views of a skirt valve 1600 that includes a core 1620, and an elongated rim 1610 that extends outwardly from the core 1620. Preferably, the rim 1610 is configured to have a downwardly-sloping surface as the rim 1610 extends from core 1620. In some contemplated embodiments, the core 1620 and the rim 1610 can be composed of a single piece, although the core 1620 and rim 1610 could alternatively be separate pieces that are coupled to create a seal therebetween. Although the skirt valve 1600 is shown to have a circular shape, all commercially suitable shapes are contemplated including, for example, a square shape, an ovular shape, an icosagon-shape, and a half-circle shape.

Preferably, the rim 1610 extends from the core 1620 in a 360 degree manner. As shown in FIG. 16C, the rim 1610 can be tapered and include an inner portion 1612 and an outer edge interval 1614. In this manner, the inner portion 1612 can have a greater average thickness than the outer edge interval 1614, which gives the inner portion 1612 additional rigidity, while giving the outer edge interval 1614 greater flexibility than the inner portion 1612. Thus, unlike umbrella valves of the prior art, at least one-eighth, preferably one-third, more preferably at least one-half, and most preferably, at three three-fourths, of the rim 1610 can remain rigid, and provide sufficient strength such as to prevent backflow from flowing upstream through the valve 1600.

In an exemplary embodiment, the inner portion 1612 of the rim 1610 can have an average thickness of between 0.001-0.05 inches, more preferably of between 0.001-0.01 inches, and still more preferably of between 0.001-0.008 inches. Using the same example, the outer edge interval 1614 could have an average thickness that is less than 95%, more preferably 90%, 85%, 80%, or 75%, of the average thickness of the inner portion 1612. However, the specific average thicknesses of the inner portion 1612 and the outer edge interval 1614 will depend on the size and dimension of the skirt valve 1600, and the specific application.

The core 1620 can advantageously include an opening 1630 such that the core 1620 can be mounted or other affixed to a stem of a cartridge or other valve housing. This advantageously eliminates the need for spokes or other means that extend above the valve 1600, which are prone to collecting urine, hair and debris.

Optionally, the skirt valve 1600 could include one or more ribs (not shown) extending from the core 1620 along a portion of the rim 1610 to provide additional support to the rim 1610. Preferably, the ribs are disposed on a lower (downstream) surface of the valve 1600. The addition of ribs is beneficial, especially where the skirt valve has a diameter or length of greater than three inches. For example, the skirt valve 1600 could include one or more ribs having a diameter of between 0.03-0.1 inches, and more preferably, of between 0.04-0.08 inches. However, the specific thickness of the ribs will depend on the diameter or length of the skirt valve 1600, and the specific application. For example, the ribs might be thicker for a skirt valve having a greater diameter, and thinner for a skirt valve having a lesser diameter.

Figure 17:
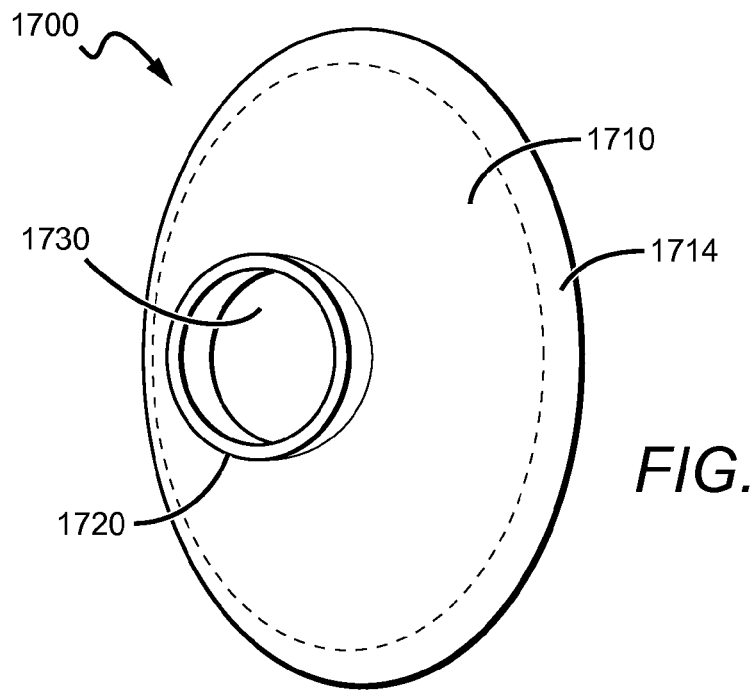
FIG. 17 is a perspective view of one embodiment of a valve having an ovular horizontal cross-section.
Figure 18:
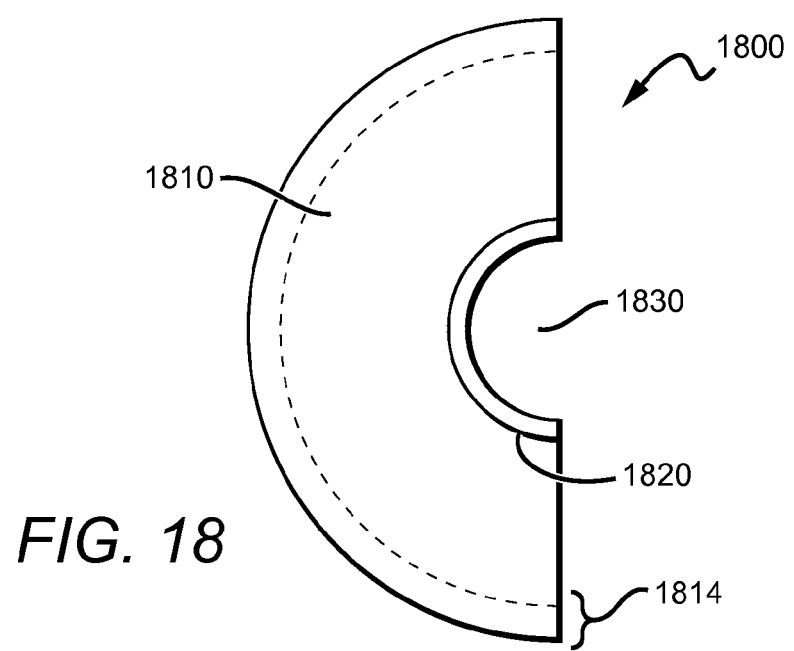
FIG. 18 is a top view of another embodiment of a valve having a semi-circular horizontal cross-section.

In FIG. 17, an valve 1700 including a rim 1710 that has a ovular horizontal cross-section, and includes an inner portion 1712 and an outer edge interval 1714. With respect to the remaining numerals in FIG. 17, the same considerations for like components with like numerals of FIG. 16 apply. FIG. 18 illustrates a valve 1800 that includes a rim 1810 having a semi-circular horizontal cross-section. With respect to the remaining numerals in FIG. 18, the same considerations for like components with like numerals of FIG. 16 apply.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A cartridge for regulating a fluid flow, comprising:
    a cartridge housing;
    an insert that is user-removable from the housing;
    a downwardly-sloping first valve configured to be biased in a closed position;
    a downwardly-sloping second valve fluidly coupled to the first valve, and wherein the second valve comprises a gravity flow valve and is disposed downstream of the first valve; and
    first and second downwardly-sloping valve seats, wherein a first end portion of the first valve is seated beneath the first downwardly-sloping valve seat when the first valve is in a closed position, and wherein a second end portion of the second valve is seated beneath the second downwardly-sloping valve seat when the second valve is in a closed position.

2. The cartridge of claim 1, wherein the first valve is a gravity flow valve.

3. The cartridge of claim 1, wherein the first valve is disposed within the insert.

4. The cartridge of claim 1, wherein an interior of the insert forms a passageway configured to allow a fluid to flow from the first valve to the second valve.

5. The cartridge of claim 1, wherein the second valve is biased in a closed position.

6. The cartridge of claim 1, wherein the first and second valves are separated by no more than six inches.

7. The cartridge of claim 1, wherein the first valve is electrically operated.

8. The cartridge of claim 1, further comprising an ultraviolet light emitter.

9. The cartridge of claim 8, wherein the ultraviolet light emitter is disposed within the cartridge such that ultraviolet light is radiated on at least part of a fluid passageway of the cartridge.

10. The cartridge of claim 1, wherein at least one of the first and second downwardly-sloping valves comprises a skirt valve having a tapered upper surface.

11. The cartridge of claim 1, wherein at least one of the first and second valves is biased to be convex in an upstream direction.

12. The cartridge of claim 1, wherein the first valve has a first outer 5 mm edge interval having a first average thickness, and the second valve has a second outer 5 mm edge interval having a second average thickness, and wherein the first average thickness is less than 95% of the second average thickness.

13. The cartridge of claim 1, further comprising a fluid trap that is at least partially disposed within the cartridge.

14. The cartridge of claim 1, further comprising a fluid trap at least partially formed by insertion of the insert into the cartridge.

15. The cartridge of claim 1, wherein at least one of the first and second valves is at least partially opened by a pressure of a fluid against a surface of the respective first or second valve.

16. The cartridge of claim 1, further comprising a visible lighting system.

17. The cartridge of claim 1, further comprising a valve controller, coupled to a sensor that provides a signal used by the valve controller to operate at least one of the first valve, the second valve, and a vibrator.

18. The cartridge of claim 17, wherein the sensor comprises at least one of a fluid sensor, a temperature sensor, an infrared sensor, an optical sensor, a capacitive sensor, a proximity sensor and an inductive sensor.

19. A urinal that includes the cartridge of claim 1.

20. A floor drain that includes the cartridge of claim 1.

* * * * *